United States Patent
Matsuura

(10) Patent No.: US 8,145,148 B2
(45) Date of Patent: Mar. 27, 2012

(54) TRANSMITTER AND COMMUNICATION APPARATUS

(75) Inventor: Toru Matsuura, Osaka (JP)

(73) Assignee: Panasonic Corporation, Osaka (JP)

( * ) Notice: Subject to any disclaimer, the term of this patent is extended or adjusted under 35 U.S.C. 154(b) by 694 days.

(21) Appl. No.: 12/332,623

(22) Filed: Dec. 11, 2008

(65) Prior Publication Data

US 2009/0156142 A1   Jun. 18, 2009

(30) Foreign Application Priority Data

Dec. 12, 2007   (JP) .................................. 2007-320543

(51) Int. Cl.
*H04B 1/04* (2006.01)
(52) U.S. Cl. ......... 455/110; 455/136; 455/103; 455/108
(58) Field of Classification Search ................. 455/110, 455/136, 103, 108; 375/271, 376
See application file for complete search history.

(56) References Cited

U.S. PATENT DOCUMENTS

| | | | | |
|---|---|---|---|---|
| 5,093,637 | A * | 3/1992 | Isota et al. | 332/103 |
| 5,396,484 | A * | 3/1995 | Itoh | 370/204 |
| 5,751,705 | A * | 5/1998 | Sato | 370/335 |
| 6,717,998 | B2 * | 4/2004 | Adachi et al. | 375/376 |
| 7,092,683 | B2 * | 8/2006 | Tanaka et al. | 455/108 |
| 2004/0124739 | A1* | 7/2004 | Li | 310/311 |
| 2005/0008093 | A1* | 1/2005 | Matsuura et al. | 375/271 |

FOREIGN PATENT DOCUMENTS

WO   2006/118317   11/2006

* cited by examiner

*Primary Examiner* — Jean B Jeanglaude
(74) *Attorney, Agent, or Firm* — Wenderoth, Lind & Ponack, L.L.P.

(57) ABSTRACT

A signal generation section generates an amplitude signal and an angle-modulated signal. An adaptive compensation filter performs waveform shaping on the amplitude signal in accordance with a magnitude of the amplitude signal. An amplitude amplification section outputs a signal proportional to a magnitude of the signal subjected to waveform shaping in the adaptive compensation filter. An amplitude modulation section amplitude-modulates the angle-modulated signal by the signal outputted from the amplitude amplification section and outputs the resulting signal as a modulated signal. Characteristics of the adaptive compensation filter are inverse characteristics of transfer characteristics from an input of the amplitude amplification section to an output of the amplitude modulation section.

17 Claims, 23 Drawing Sheets

| MAGNITUDE CLASSIFICATION OF AMPLITUDE SIGNAL | FILTER COEFFICIENT | | |
|---|---|---|---|
| | $b_0$ | $b_1$ | $a_1$ |
| $m_3 \leq m$ | $b_{04}$ | $b_{14}$ | $a_{14}$ |
| $m_2 \leq m < m_3$ | $b_{03}$ | $b_{13}$ | $a_{13}$ |
| $m_1 \leq m < m_2$ | $b_{02}$ | $b_{12}$ | $a_{12}$ |
| $m < m_1$ | $b_{01}$ | $b_{11}$ | $a_{11}$ |

$$H(z) = \sum_{k=0}^{n} b_k z^{-k}$$

$$H(z) = \frac{\sum_{k=0}^{n} b_k z^{-k}}{1 - \sum_{k=0}^{n} a_k z^{-k}}$$

F I G. 3 C
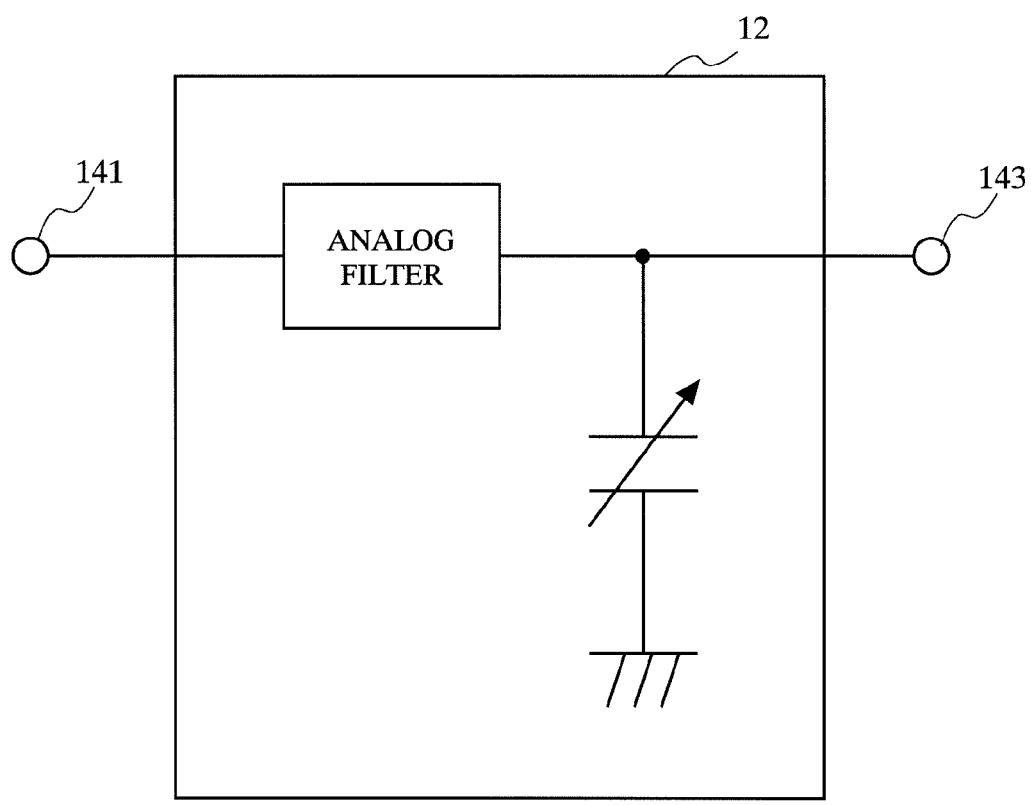

F I G. 9 A
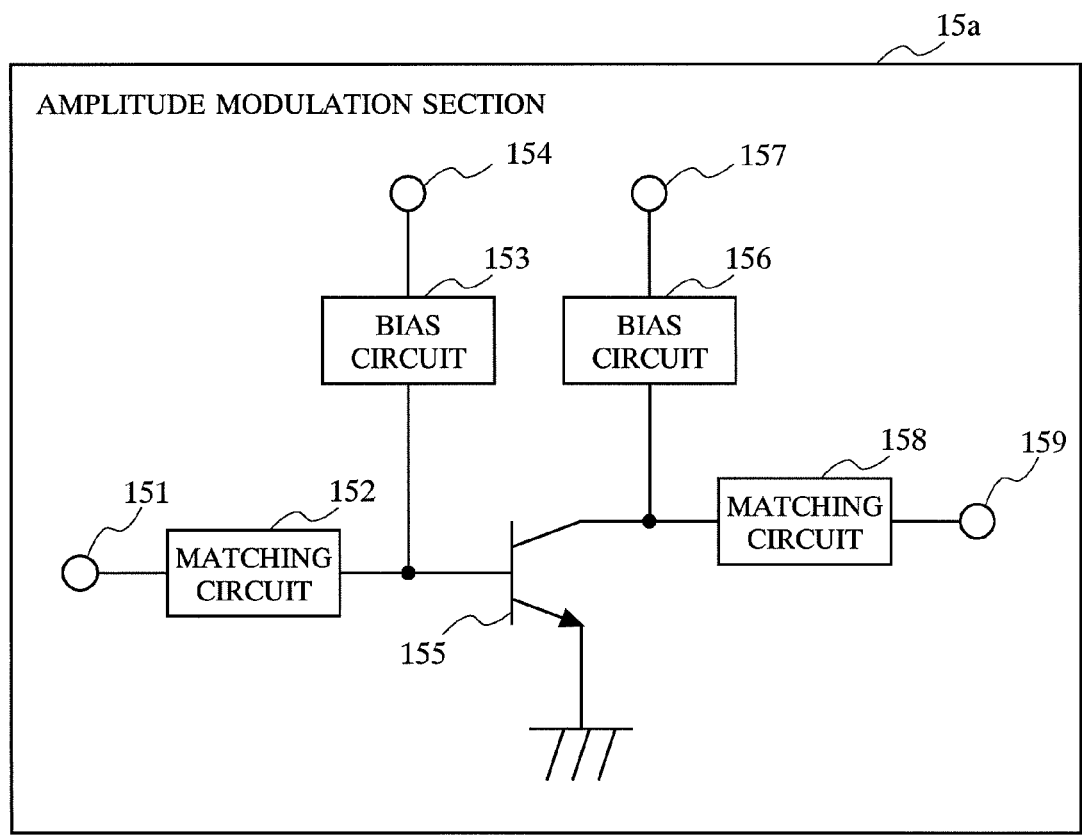

FIG. 12

| POWER INFORMATION P | MAGNITUDE CLASSIFICATION OF AMPLITUDE SIGNAL | FILTER COEFFICIENT | | |
|---|---|---|---|---|
| | | $b_0$ | $b_1$ | $a_1$ |
| $P_2 \leq P$ | $m_3 \leq m$ | $b_{043}$ | $b_{143}$ | $a_{143}$ |
| | $m_2 \leq m < m_3$ | $b_{033}$ | $b_{133}$ | $a_{133}$ |
| | $m_1 \leq m < m_2$ | $b_{023}$ | $b_{123}$ | $a_{123}$ |
| | $m < m_1$ | $b_{013}$ | $b_{113}$ | $a_{113}$ |
| $P_1 \leq P < P_2$ | $m_3 \leq m$ | $b_{042}$ | $b_{142}$ | $a_{142}$ |
| | $m_2 \leq m < m_3$ | $b_{032}$ | $b_{132}$ | $a_{132}$ |
| | $m_1 \leq m < m_2$ | $b_{022}$ | $b_{122}$ | $a_{122}$ |
| | $m < m_1$ | $b_{012}$ | $b_{112}$ | $a_{112}$ |
| $P < P_1$ | $m_3 \leq m$ | $b_{041}$ | $b_{141}$ | $a_{141}$ |
| | $m_2 \leq m < m_3$ | $b_{031}$ | $b_{131}$ | $a_{131}$ |
| | $m_1 \leq m < m_2$ | $b_{021}$ | $b_{121}$ | $a_{121}$ |
| | $m < m_1$ | $b_{011}$ | $b_{111}$ | $a_{111}$ |

F I G. 1 4
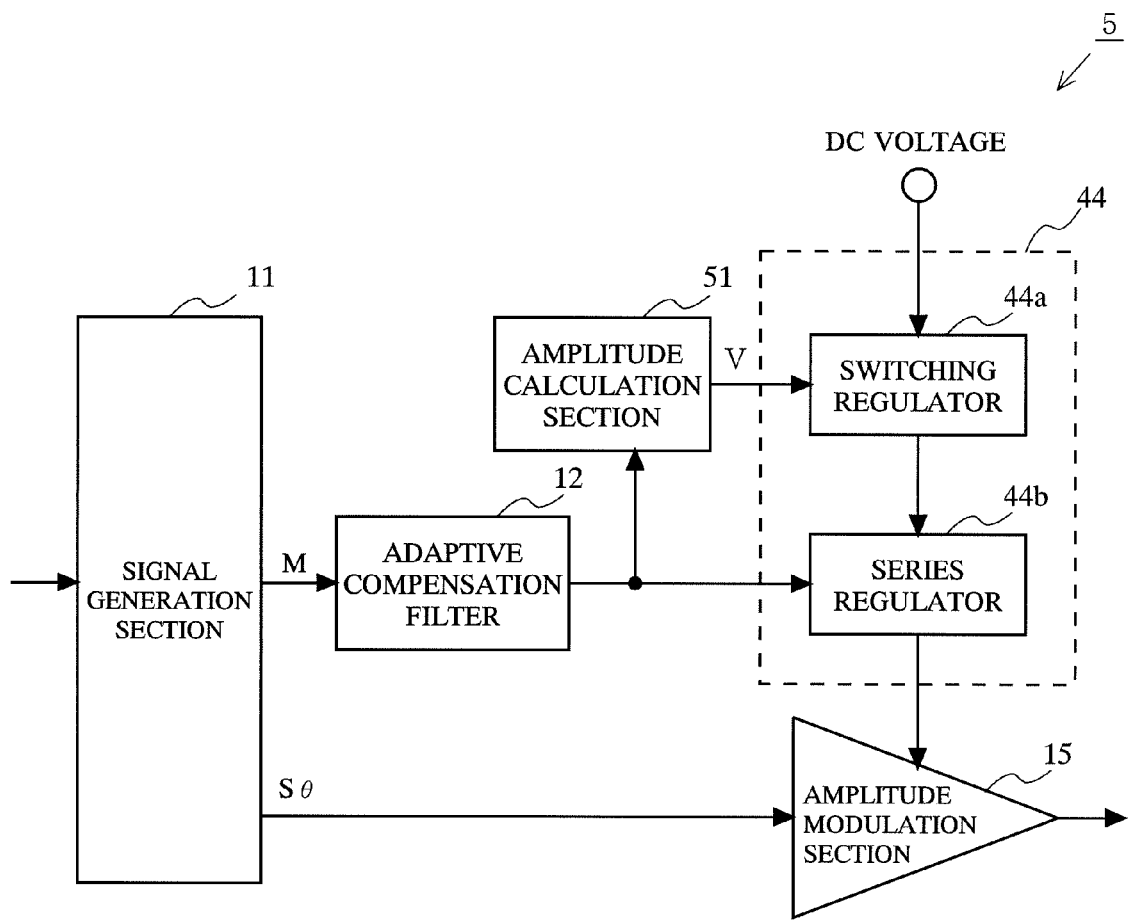

F I G. 1 8
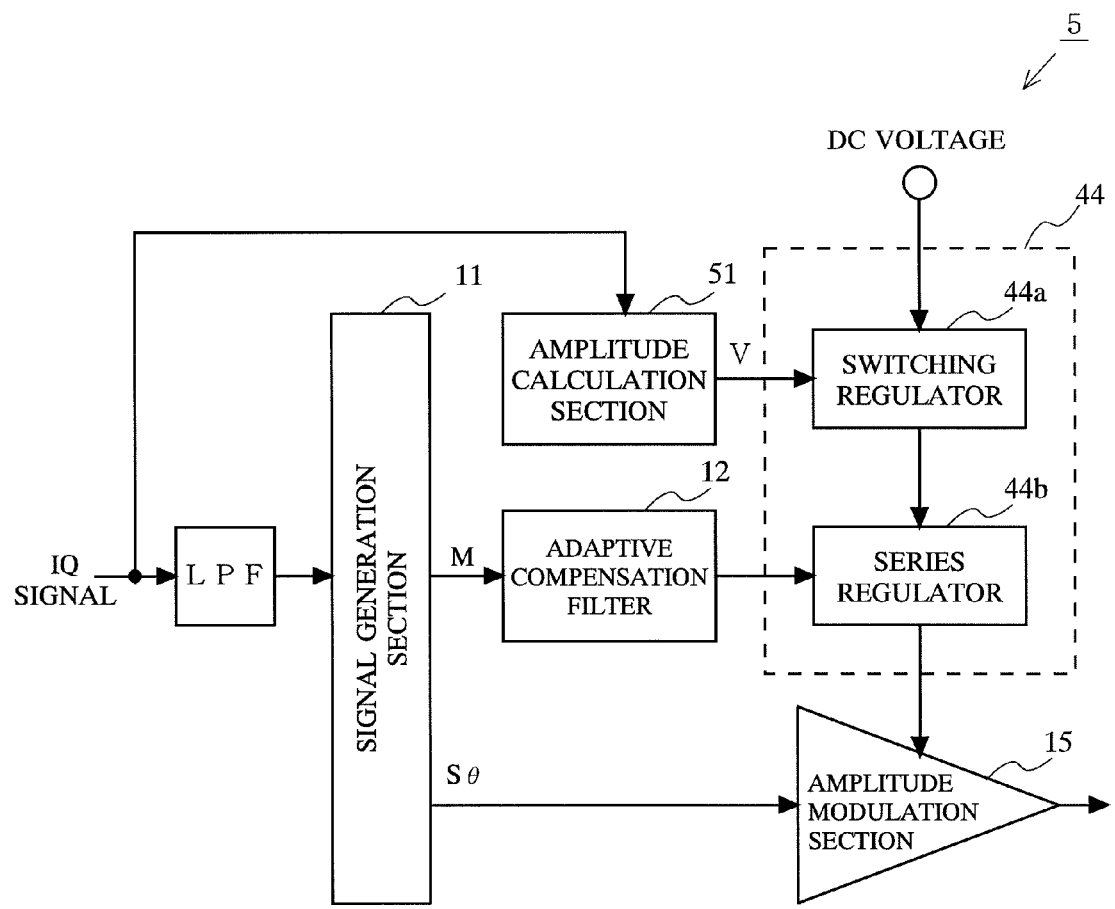

F I G. 1 9
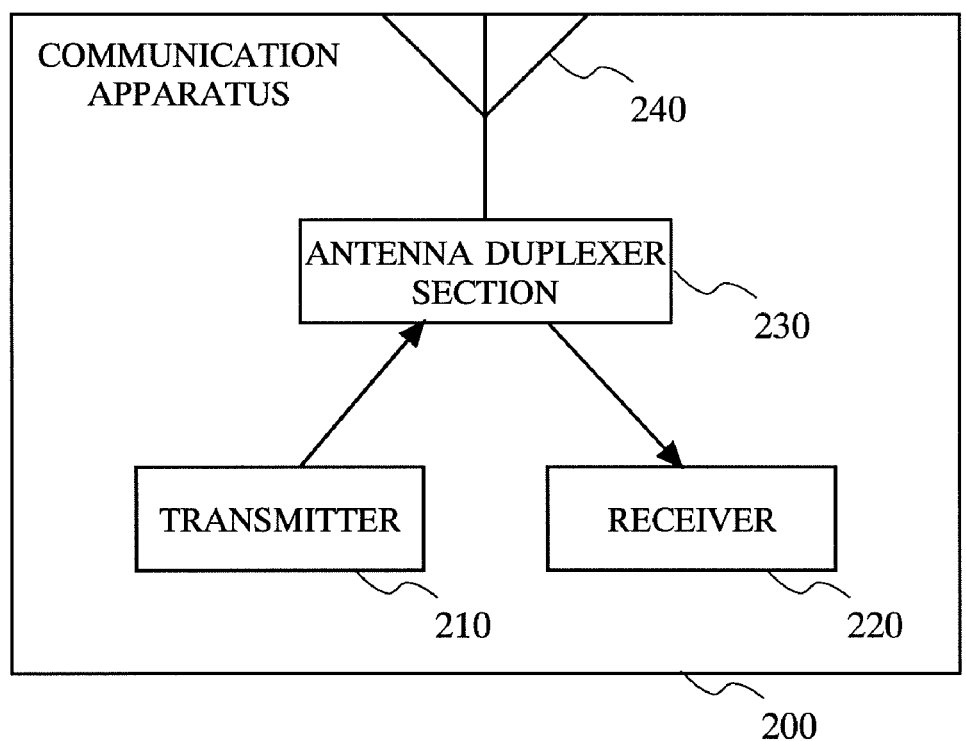

F I G. 2 2  PRIOR ART
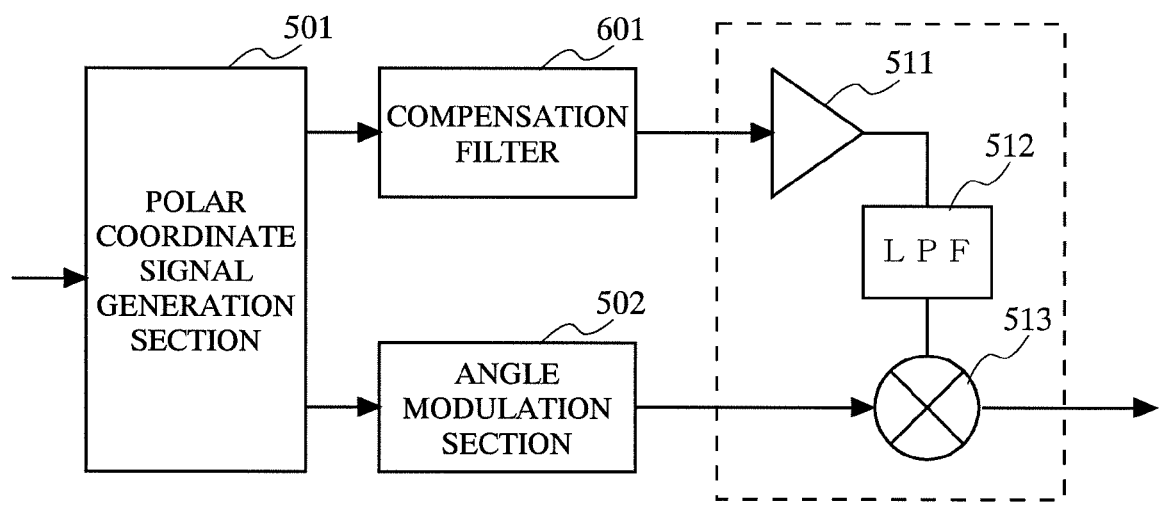

TRANSMITTER AND COMMUNICATION APPARATUS

BACKGROUND OF THE INVENTION

1. Field of the Invention

The present invention relates to a transmitter used for a communication apparatus such as a mobile phone and a wireless LAN, and particularly to a transmitter for outputting a transmitted signal with low distortion and at high efficiency even in a wideband modulation scheme and to a communication apparatus using the same.

2. Description of the Background Art

Conventionally, as a radio-frequency power amplifier for amplifying a modulated signal including an envelope fluctuation component, a class-A or class-AB linear amplifier is used to linearly amplify the envelope fluctuation component. Such a linear amplifier has high linearity, but, on the other hand, constantly consumes the electrical power resulting from a DC bias component, and therefore has lower power efficiency than that of, for example, a class-C or class-E non-linear amplifier. Therefore, when this radio-frequency power amplifier is applied to a battery-powered mobile communication apparatus, the operating time decreases due to a large amount of power consumption of the radio-frequency power amplifier. When the radio-frequency power amplifier is applied to a base station device of a wireless system where a plurality of high-power transmitters are provided, the device increases in size and the heating value increases.

In response, as a transmitter that operates at high efficiency, conventionally, a transmitter applying polar modulation is proposed. FIG. 20 is a block diagram showing a conventional transmitter 500 applying polar modulation. Referring to FIG. 20, the conventional transmitter 500 includes a polar coordinate signal generation section 501, an angle modulation section 502, a regulator 504, and an amplitude modulation section 505.

The polar coordinate signal generation section 501 generates an amplitude signal and a phase signal. The amplitude signal is inputted to the regulator 504 and the phase signal is inputted to the angle modulation section 502. To the regulator 504, a direct-current voltage is supplied. The regulator 504 supplies to the amplitude modulation section 505 a voltage corresponding to the inputted amplitude signal. The angle modulation section 502 generates an angle-modulated signal by angle-modulating the inputted phase signal and outputs the angle-modulated signal to the amplitude modulation section 505. The amplitude modulation section 505 amplitude-modulates, by the voltage supplied from the regulator 504, the angle-modulated signal outputted from the angle modulation section 502 and outputs the resulting signal as a modulated signal. This modulated signal is outputted as a transmitted signal.

Additionally, in the transmitter applying polar modulation, distortion may occur in a transmitted signal due to nonlinearities of the regulator 504 and the amplitude modulation section 505. In response, conventionally, a method of compensating for the nonlinearities of the regulator 504 and the amplitude modulation section 505 in the transmitter applying polar modulation by a compensation filter and thus decreasing the distortion of the transmitted signal is disclosed (see International Publication no. WO/2006/118317, for example).

FIG. 21 shows a conventional transmitter 600 using this method. The conventional transmitter 600 has a structure where the conventional transmitter 500 further includes a compensation filter 601. The compensation filter 601 has the inverse characteristics of the transfer characteristics from the input of the regulator 504 to the output of the amplitude modulation section 505 and compensates for the frequency characteristics of the regulator 504 and the amplitude modulation section 505 by performing waveform shaping on the amplitude signal generated by the polar coordinate signal generation section 501. This makes it possible to suppress the distortion caused by the insufficiency of the frequency bandwidths of the regulator 504 and the amplitude modulation section 505 and to realize a transmitter that operates with low distortion and at high efficiency even in a wideband modulation scheme.

The structure of the regulator 504 and the amplitude modulation section 505 described above can be represented by, as shown in FIG. 22, an equivalent circuit where a low-pass filter (LPF) 512 is provided between an amplification section 511 and a multiplication section 513. It is found that the cutoff frequency may change due to the LPF 512, depending on the magnitude of the amplitude signal outputted from the amplification section 511. Therefore, there remains the problem that, in the conventional transmitter 600 using the compensation filter 601 having a fixed value, it is difficult to compensate for the frequency bandwidths of the regulator 504 and the amplitude modulation section 505 and thus it is impossible to sufficiently suppress the distortion of the transmitted signal.

SUMMARY OF THE INVENTION

Therefore, an object of the present invention is to provide a transmitter that operates with low distortion and at high efficiency even in a wideband modulation scheme, regardless of the magnitude of an amplitude signal, and also to provide a communication apparatus using the same.

The object of the present invention is directed to a transmitter for generating and outputting a transmitted signal based on inputted data. To achieve the above object, the transmitter of the present invention includes a signal generation section, an adaptive compensation filter, an amplitude amplification section, and an amplitude modulation section.

The signal generation section generates an amplitude signal and an angle-modulated signal based on an amplitude component and a phase component that are obtained by performing signal processing on the data. The adaptive compensation filter selects filter values corresponding to a magnitude of the amplitude signal and performs waveform shaping on the amplitude signal in accordance with characteristics obtained from the selected filter values. The amplitude amplification section outputs a signal corresponding to a magnitude of the signal subjected to waveform shaping in the adaptive compensation filter. The amplitude modulation section amplitude-modulates the angle-modulated signal by the signal outputted from the amplitude amplification section and outputs the resulting signal as a modulated signal. The characteristics, obtained from the selected filter values in the adaptive compensation filter, are inverse characteristics of transfer characteristics from an input of the amplitude amplification section to an output of the amplitude modulation section.

The preferred adaptive compensation filter includes: a table having stored therein filter coefficients as the filter values corresponding to the magnitude of the amplitude signal; a control section operable to determine the magnitude of the amplitude signal and operable to select filter coefficients corresponding to the determination from the table; and a filter operable to perform waveform shaping on the amplitude signal, using the filter coefficients selected by the control section. It is preferable that the amplitude amplification section is either a series regulator or a switching regulator, or has the following structure.

When the signal generation section further outputs power information set based on a baseband of the transmitter, the amplitude amplification section may include: a switching regulator operable to receive the power information and operable to output a voltage controlled by the power information; and a series regulator operable to receive the voltage outputted from the switching regulator and operable to output a signal corresponding to a magnitude of the signal subjected to waveform shaping in the adaptive compensation filter. Alternatively, the amplitude amplification section may include: a switching regulator operable to receive the power information and operable to output a current controlled by the power information; a series regulator operable to output a current corresponding to a magnitude of the signal subjected to waveform shaping in the adaptive compensation filter; and an addition section operable to add the output of the switching regulator to the output of the series regulator and operable to output the addition result.

Additionally, a multiplication section operable to multiply the amplitude signal by the power information may be provided, and an adaptive compensation filter may select filter values corresponding to a magnitude of the signal outputted from the multiplication section and perform waveform shaping on the signal, outputted from the multiplication section, in accordance with characteristics obtained from the selected filter values. In this case, a table may have stored therein filter coefficients as the filter values corresponding to the magnitude of the signal outputted from the multiplication section, and a control section may determine the magnitude of the signal outputted from the multiplication section.

Additionally, an adaptive compensation filter may select filter values corresponding to a magnitude of the amplitude signal and the power information and perform waveform shaping on the amplitude signal in accordance with characteristics obtained from the selected filter values, and a multiplication section operable to multiply the signal subjected to waveform shaping in the adaptive compensation filter by the power information may be further provided. In this case, a table may have stored therein filter coefficients as the filter values corresponding to a combination of the magnitude of the amplitude signal and the power information, and a control section may separately determine the magnitude of the amplitude signal and the power information.

Additionally, an amplitude calculation section operable to perform a predetermined calculation on the signal subjected to wave form shaping in the adaptive compensation filter and operable to output the resulting signal may be further provided, and the amplitude amplification section may include: a switching regulator operable to receive the output signal from the amplitude calculation section and operable to output a voltage controlled by the output signal; and a series regulator operable to receive the voltage outputted from the switching regulator and operable to output a signal corresponding to a magnitude of the signal subjected to waveform shaping in the adaptive compensation filter.

The present invention is further directed to a communication apparatus including the transmitters described above. The communication apparatus includes: any one of the transmitters described above, operable to generate a transmitted signal; and an antenna operable to output the transmitted signal generated by the transmitter. Additionally, the communication apparatus may further include: a receiver operable to process a received signal received from the antenna; and an antenna duplexer section operable to output to the antenna the transmitted signal generated by the transmitter and operable to output to the receiver the received signal received from the antenna.

Based on the present invention, the adaptive compensation filter dynamically performs an operation of compensating for the amplitude signal outputted from the signal generation section, in accordance with the magnitude of the amplitude signal or with the magnitude of the amplitude signal and the power information, so that the adaptive compensation filter has the inverse characteristics of the transfer characteristics from the input of the amplitude amplification section to the output of the amplitude modulation section. This makes it possible to suppress the distortion caused by the insufficiency of the frequency bandwidths of the amplitude amplification section and the amplitude modulation section. Therefore, it is possible to realize a transmitter capable of outputting a transmitted signal with low distortion and at high efficiency even in a wideband modulation scheme.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3C is a diagram showing an example (analog) of a detailed structure of the filter 123;

FIG. 7A is a diagram showing an example of a detailed structure of a signal generation section 11a;

FIG. 8A is a diagram showing an example of a detailed structure of a regulator 14a;

FIG. 9A is a diagram showing an example of a detailed structure of an amplitude modulation section 15a;

FIG. 12 is a diagram showing an example of a table 321;

FIG. 14 is a diagram showing the structure of a transmitter 5 according to a fifth embodiment of the present invention;

FIG. 18 is a diagram showing the structure of another transmitter 5 according to the fifth embodiment of the present invention;

FIG. 19 is a diagram showing the structure of a communication apparatus 200 according to a sixth embodiment of the present invention;

FIG. 22 is a diagram showing an equivalent circuit of the structure of a regulator 504 and an amplitude modulation section 505.

DESCRIPTION OF THE PREFERRED EMBODIMENTS

First Embodiment

Figures 1, 2:
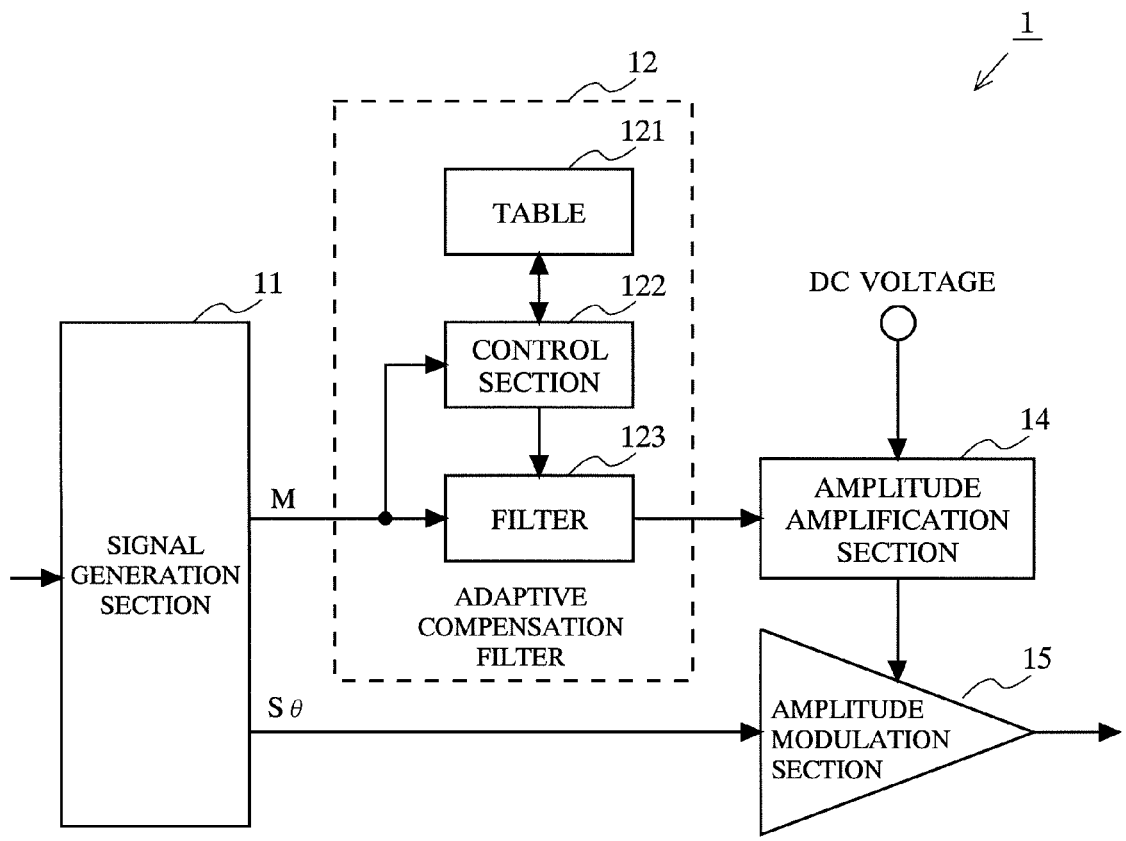
FIG. 1 is a diagram showing the structure of a transmitter 1 according to a first embodiment of the present invention.
FIG. 2 is a diagram showing an example of a table 121.
Figure 3A:
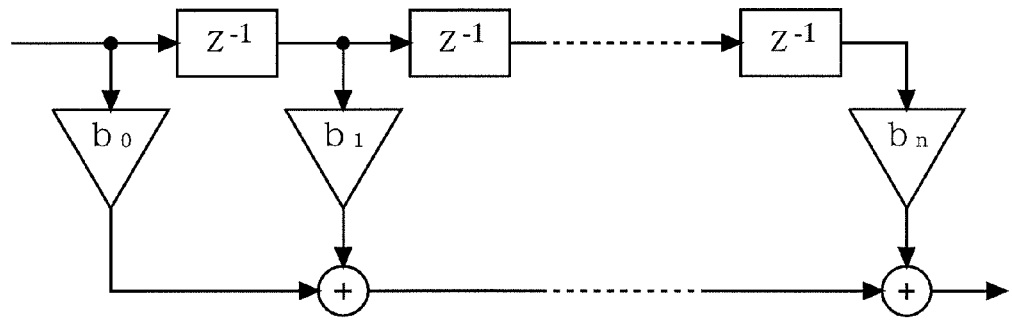
FIG. 3A is a diagram showing an example (FIR) of a detailed structure of a filter 123.
Figure 3B:
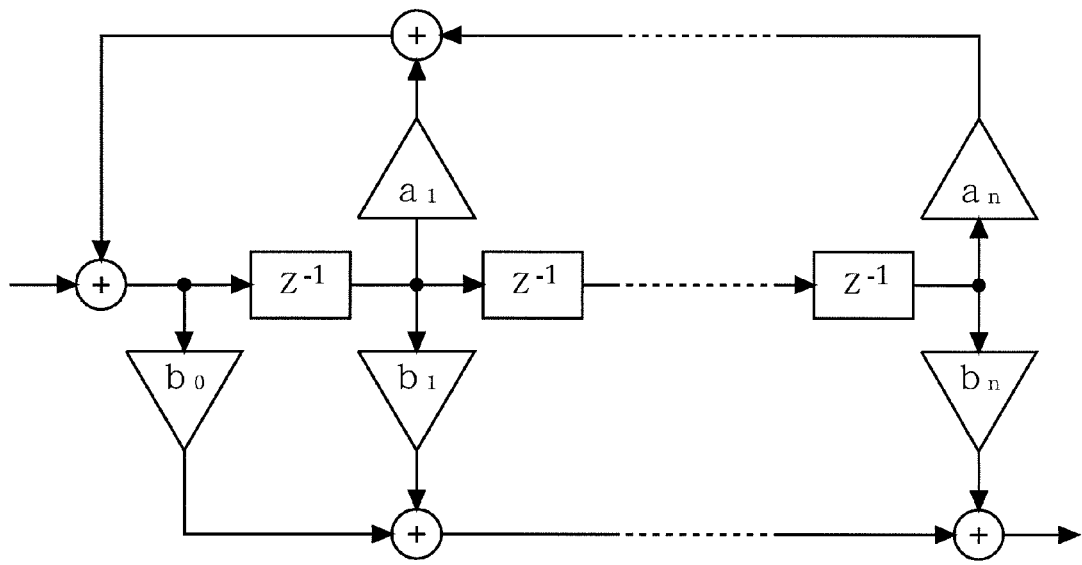
FIG. 3B is a diagram showing an example (IIR) of a detailed structure of the filter 123.

FIG. 1 is a diagram showing the structure of a transmitter 1 according to a first embodiment of the present invention. Referring to FIG. 1, the transmitter 1 includes a signal generation section 11, an adaptive compensation filter 12, an amplitude amplification section 14, and an amplitude modulation section 15. The adaptive compensation filter 12 includes a table 121, a control section 122, and a filter 123.

The signal generation section 11 outputs an amplitude signal M and an angle-modulated signal Sθ based on an amplitude component and a phase component that are obtained by performing signal processing on input data. The amplitude signal M is subjected to waveform shaping corresponding to the magnitude of the amplitude signal M in the adaptive compensation filter 12 and then is inputted to the amplitude amplification section 14. The amplitude amplification section 14 outputs a signal controlled by the inputted amplitude signal. Typically, the amplitude amplification section 14 outputs a signal proportional to the magnitude of the inputted amplitude signal. The signal outputted from the amplitude amplification section 14 is inputted to the amplitude modulation section 15. The angle-modulated signal Sθ is inputted to the amplitude modulation section 15. The amplitude modulation section 15 amplitude-modulates the angle-modulated signal Sθ by the signal inputted from the amplitude amplification section 14 and outputs the resulting angle-modulated and amplitude-modulated signal as a transmitted signal.

Further, with reference to FIGS. 2 through 5, the table 121, the control section 122, and the filter 123, which are included in the adaptive compensation filter 12, will be described in detail below. Note that, since in this example the filter 123 is a digital filter shown in FIG. 3A or FIG. 3B, a case is described where the filter values used by the filter 123 are "filter coefficients". However, when the filter 123 is an analog filter shown in FIG. 3C, the filter values are "capacitance values" of a variable capacitance.

In the table 121, the filter values used by the filter 123, i.e., filter coefficients in this embodiment, are each stored in accordance with the magnitude of the amplitude signal M. The table 121 of FIG. 2 shows filter coefficients b0, b1, and a1 in the case where an FIR filter (FIG. 3A) or an IIR filter (FIG. 3B) is used as the filter 123 and the magnitude of the amplitude signal M (to be exact, the magnitude of the signal m inputted to the table reference section 1223 of the control section 122 described below) is classified into four groups. The filter coefficients stored in the table 121 are set in advance to such values that the filter 123 can have the inverse characteristics of the transfer characteristics from the input of the amplitude amplification section 14 to the output of the amplitude modulation section 15, with respect to each magnitude of the amplitude signal M. Typically, this setting of the filter coefficients is made by the following method.

First, transfer characteristics H(s) from the input of the amplitude amplification section 14 to the output of the amplitude modulation section 15 are obtained using an input signal X(s) to the amplitude amplification section 14 and an envelope component Y(s) of an output signal from the amplitude modulation section 15, based on the following equation [1].

$$H(s)=Y(s)/X(s) \quad [1]$$

Figure 4:
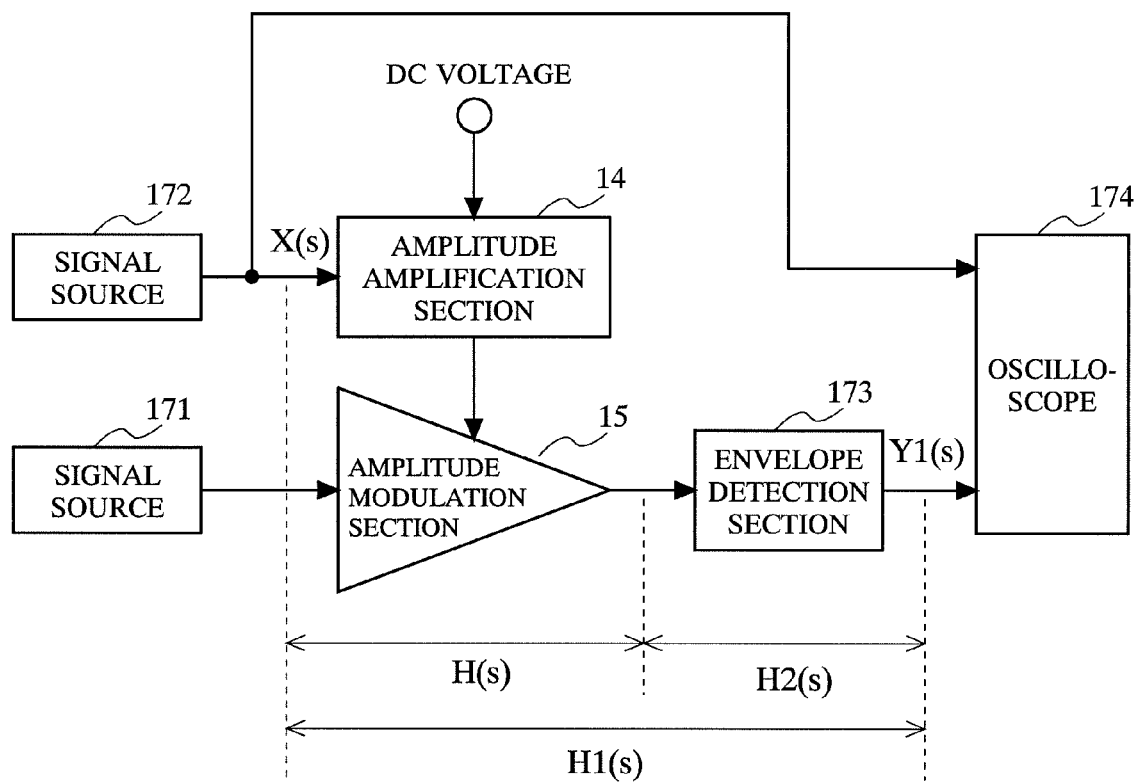
FIG. 4 is a diagram illustrating a method of obtaining transfer characteristics H(s) from the input of an amplitude amplification section 14 to the output of an amplitude modulation section 15.
Figure 5:
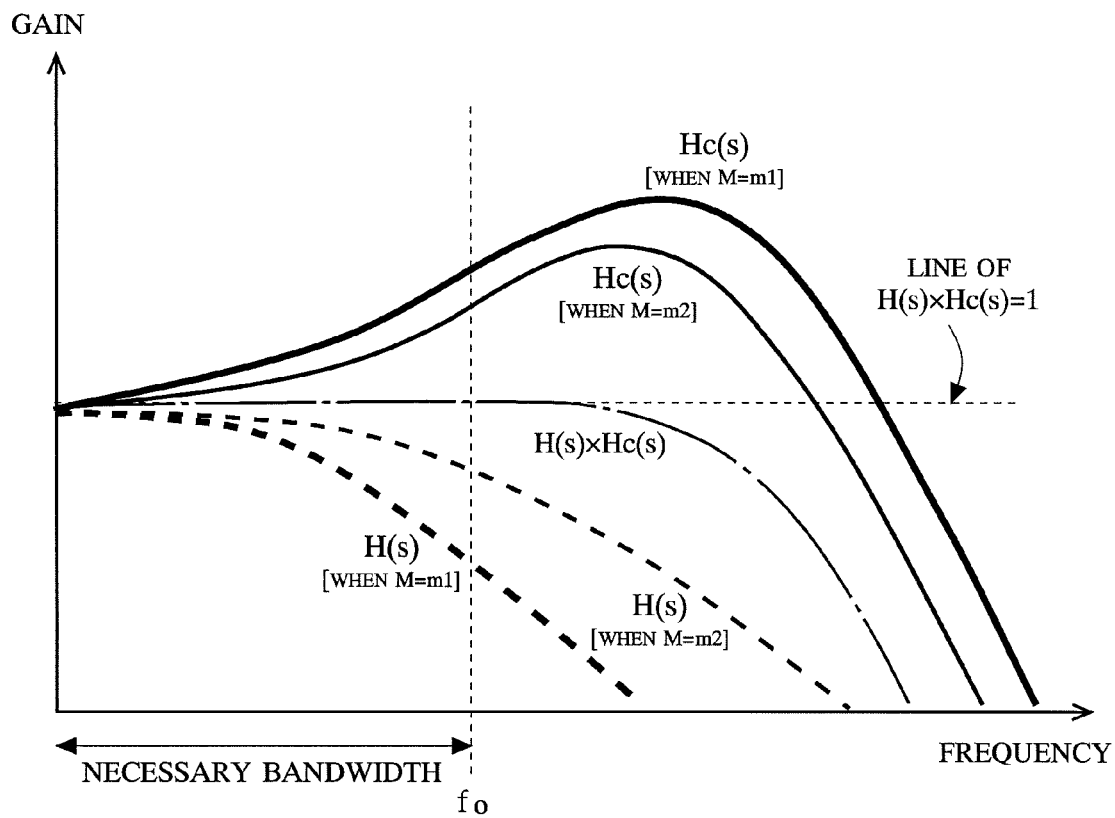
FIG. 5 is a diagram showing the relation between the transfer characteristics H(s) and transfer characteristics Hc(s) of the filter 123.

FIG. 4 is a diagram illustrating a specific method of obtaining the transfer characteristics H(s). Referring to FIG. 4, a signal source 171 outputs a sine-wave signal having the same frequency as the center frequency of the angle-modulated signal Sθ outputted from the signal generation section 11. A signal source 172 outputs a sine-wave signal having a frequency including any one of the frequencies of the amplitude signal M outputted from the signal generation section 11. Note that, as a signal outputted from the signal source 172, a step signal may also be used, for example.

The sine-wave signal outputted from the signal source 171 is inputted to the amplitude modulation section 15. On the other hand, the sine-wave signal outputted from the signal source 172 is amplified by the amplitude amplification section 14 and then is inputted to the amplitude modulation section 15. The amplitude modulation section 15 amplitude-modulates, by the sine-wave signal inputted via the amplitude amplification section 14, the sine-wave signal outputted from the signal source 171 and outputs the resulting signal as a modulated signal. An envelope detection section 173 detects the envelope component of the modulated signal outputted from the amplitude modulation section 15 and outputs to an oscilloscope 174 the detected envelope component as an envelope signal Y1(s). Note that the envelope detection section 173 used herein has known transfer characteristics.

To the oscilloscope 174, the input signal X(s) to the amplitude amplification section 14 is also inputted from the signal source 172. That is, the oscilloscope 174 measures the envelope signal Y1(s) and sweeps the frequency of the input signal X(s) to the amplitude amplification section 14, whereby transfer characteristics H1(s) from the input of the amplitude amplification section 14 to the output of the envelope detection section 173 can be obtained. When the transfer characteristics of the envelope detection section 173 are H2(s), the transfer characteristics H(s) from the input of the amplitude amplification section 14 to the output of the amplitude modulation section 15 can be represented by the following equation [2].

$$H(s)=H1(s)/H2(s) \quad [2]$$

After the transfer characteristics H(s) from the input of the amplitude amplification section 14 to the output of the amplitude modulation section 15 are thus obtained, filter coefficients for realizing the filter 123 having transfer characteristics Hc(s), which a-e the inverse characteristics of the transfer characteristics H(s), are obtained. That is, filter coefficients for realizing the filter 123 that satisfies H(s)×Hc(s)=1 is obtained. This setting process is repeatedly performed by appropriately changing the magnitude of the sine-wave signal outputted from the signal source 172, whereby the table 121 as shown in FIG. 2 can be created.

Note that the frequency of the signal inputted to the transmitter 1 is known in advance. Therefore, in practice, it is not necessary for the filter 123 to compensate for the inverse characteristics of the transfer characteristics H(s) in a high-frequency band where the signal is not present. That is, it is only necessary to satisfy H(s)×Hc(s)=1 in a necessary bandwidth up to a predetermined frequency f0, which is necessary for the transmitter 1 to realize low distortion. Thus, it may be that H(s)×Hc(s)<1 in a high-frequency band above the necessary bandwidth (see FIG. 5). In the case of the UTMS used for a mobile phone, the predetermined frequency f0 is approximately 20 MHz. In particular, it is preferable that the transfer characteristics H(s)×Hc(s) have low-pass characteristics so as to remove quantization noise of the transmitter 1 and unnecessary noise of an analog circuit.

Figure 6:
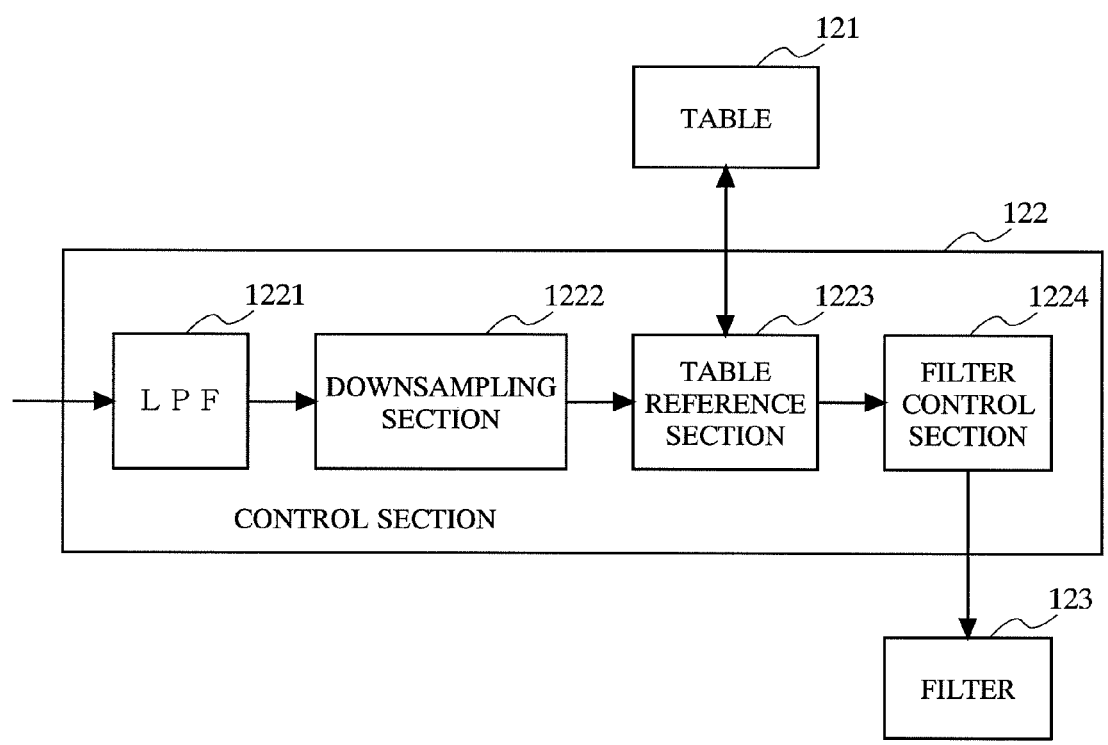
FIG. 6 is a diagram showing an example of a detailed structure of a control section 122.

FIG. 6 is a diagram showing an example of the structure of the control section 122. Referring to FIG. 6, the control section 122 includes an LPF 1221, a downsampling section 1222, a table reference section 1223, and a filter control section 1224. The amplitude signal M outputted from the signal generation section 11 is shaped into a desired signal m via the LPF 1221 and the downsampling section 1222 and then is inputted to the table reference section 1223. The table reference section 1223 determines the magnitude of the inputted signal m and selects the filter coefficients associated with the determined magnitude with reference to the table 121. The filter control section 1224 controls the filter 123 so that the filter coefficients selected by the table reference section 1223 are applied.

For example, when the signal m inputted to the table reference section 1223 is "m1≦m<m2", the filter coefficients "b0=b02", "b1=b12", and "a1=a12" are selected from the table 123. Then, these filter coefficients are applied to the filter shown in FIGS. 3A or FIG. 3B by the filter control section 1224.

Next, with reference to FIGS. 7A, 7B, 8A, 8B, 8C, 9A, and 9B, detailed structures of the signal generation section 11, the amplitude amplification section 14, and the amplitude modulation section 15 will be described.

Figure 7A:
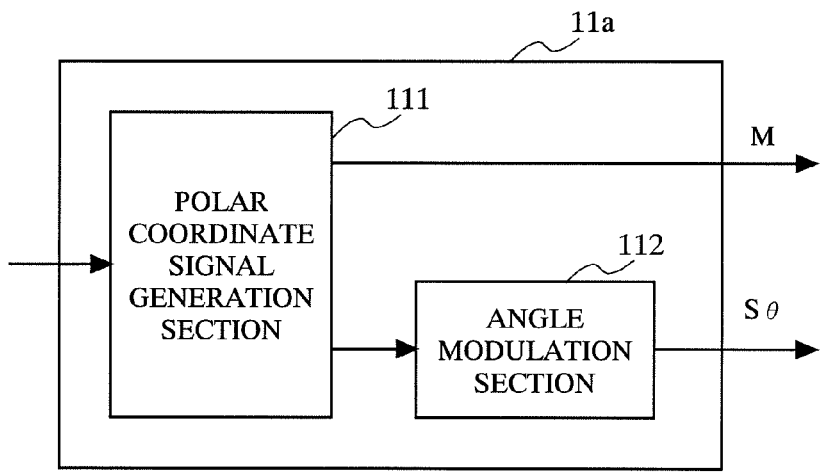

First, the signal generation section 11 can be constructed, for example, using a structure for generating a polar coordinate signal. FIG. 7A is a diagram showing an example of a signal generation section 11a, which uses a polar coordinate signal generation section 111. The signal generation section 11a includes the polar coordinate signal generation section 111 and an angle modulation section 112. The polar coordinate signal generation section 111 generates an amplitude signal M and a phase signal θ by modulating input data. The amplitude signal M is outputted as it has been generated, while the phase signal θ is angle-modulated into an angle-modulated signal Sθ by the angle modulation section 112 and then is outputted.

Figure 7B:
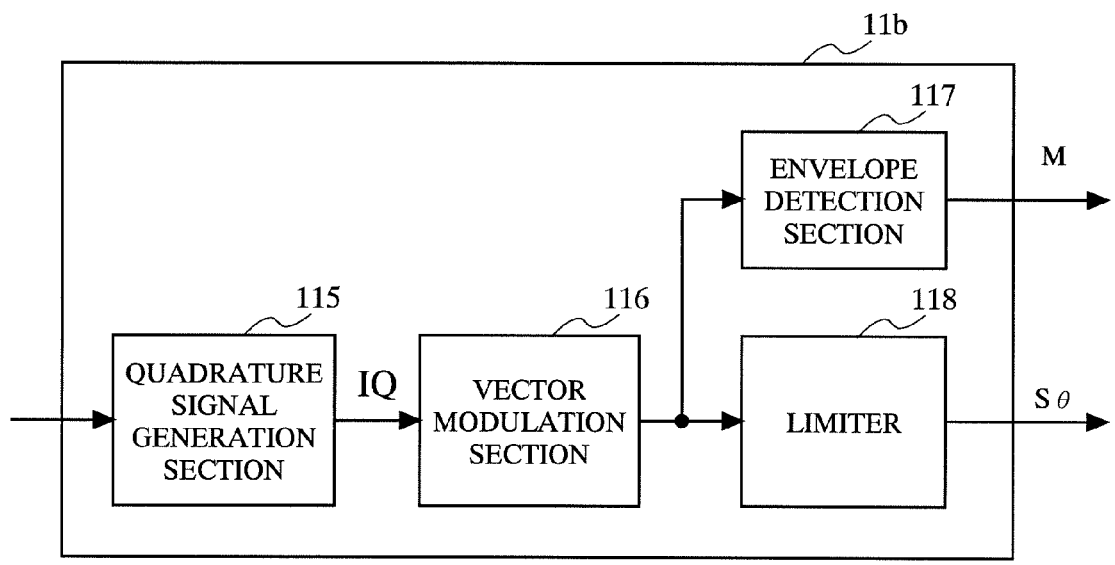
FIG. 7B is a diagram showing an example of a detailed structure of a signal generation section 11b.

Alternatively, the signal generation section 11 may also be constructed, for example, using a structure for generating a quadrature signal. FIG. 7B is a diagram showing an example of a signal generation section 11b, which uses a quadrature signal generation section 115. The signal generation section 11b includes the quadrature signal generation section 115, a vector modulation section 116, an envelope detection section 117, and a limiter 118. The quadrature signal generation section 115 generates a baseband signal formed by an IQ signal, which is quadrature data. The vector modulation section 116 vector-modulates the IQ signal outputted from the quadrature signal generation section 115. As the vector modulation section 116, a quadrature modulator may be used, for example. The envelope detection section 117 detects the envelope component of the signal outputted from the vector modulation section 116 and outputs the detected envelope component as an amplitude signal M. The limiter 118 limits the envelope component of the signal outputted from the vector modulation section 116 to a certain magnitude and outputs the signal having the limited envelope component as an angle-modulated signal Sθ.

Figure 8A:
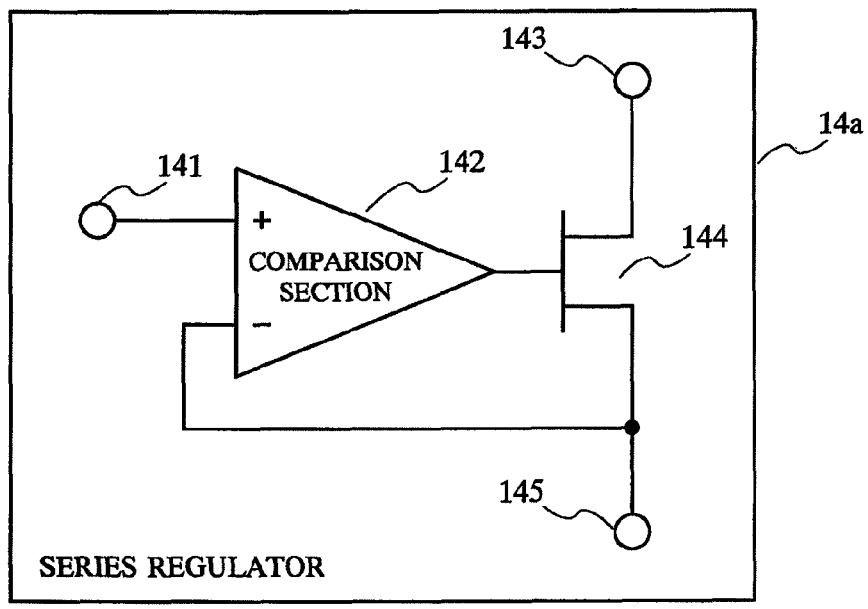

Next, the amplitude amplification section 14 can be constructed, for example, using a voltage-driven series regulator 14a shown in FIG. 8A. Referring to FIG. 8A, the series regulator 14a includes a comparison section 142 and a field-effect transistor (FET) 144. To an input terminal 141, the amplitude signal is inputted via the adaptive compensation filter 12. The amplitude signal is inputted to the gate of the FET 144 via the comparison section 142. To the drain of the FET 144, a direct-current voltage is supplied from a power supply terminal 143. From the source of the FET 144, a voltage proportional to the magnitude of the inputted amplitude signal is outputted. The voltage outputted from the source of the FET 144 is fed back to the comparison section 142. Based on the fed back voltage, the comparison section 142 adjusts the magnitude of the amplitude signal to be inputted to the gate of the FET 144. Thus, the series regulator 14a can stably supply from an output terminal 145 a voltage controlled by the magnitude of the amplitude signal. Note that the FET 144 may be replaced with a bipolar transistor (BT).

Figure 8B:
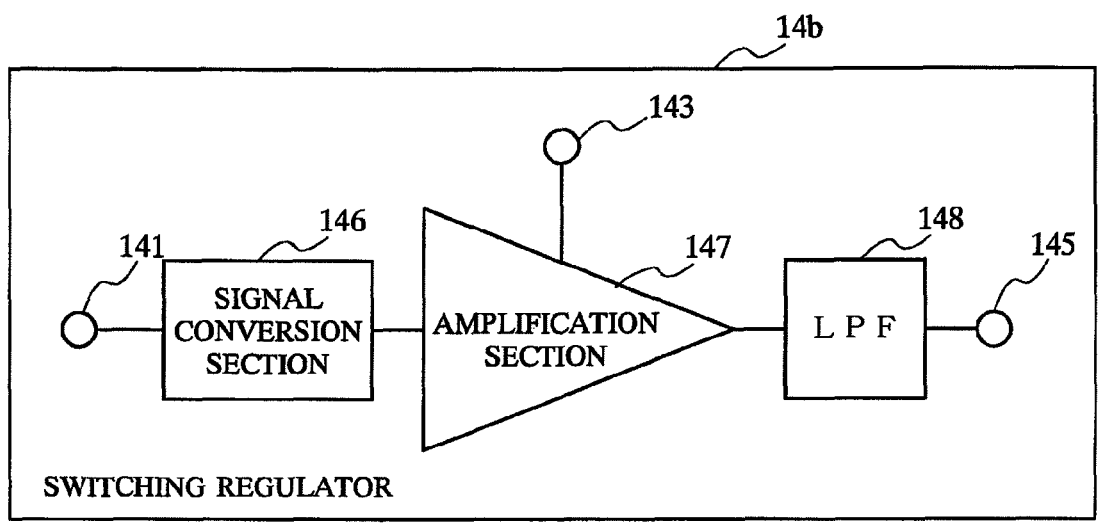
FIG. 8B is a diagram showing an example of a detailed structure of a regulator 14b.

Alternatively, the amplitude amplification section 14 can also be constructed, for example, using a voltage-driven switching regulator 14b shown in FIG. 8B. Referring to FIG. 8B, the switching regulator 14b includes a signal conversion section 146, an amplification section 147, and an LPF 148. To an input terminal 141, the amplitude signal is inputted via the adaptive compensation filter 12. The signal conversion section 146 converts the inputted amplitude signal into a PWM-modulated signal or a delta-sigma modulated signal. The amplification section 147 amplifies the resulting converted signal from the signal conversion section 146 and outputs the amplified signal. Note that, to the amplification section 147, a direct-current voltage is supplied from a power supply terminal 143. As the amplification section 147, a high-efficiency switching amplifier such as a class-D amplifier is used. The LPF 148 removes spurious components, such as quantization noise and switching noise, from the signal outputted from the amplification section 147. The signal from which the spurious components have been removed by the LPF 148 is outputted to an output terminal 145 as a voltage controlled by the magnitude of the amplitude signal. Note that, to stabilize the output voltage, the switching regulator 14b may feed the signal outputted from the LPF 148 back to the signal conversion section 146. By using the high-efficiency switching regulator 14b as the amplitude amplification section 14, the transmitter 1 can reduce the power consumption.

Figure 8C:
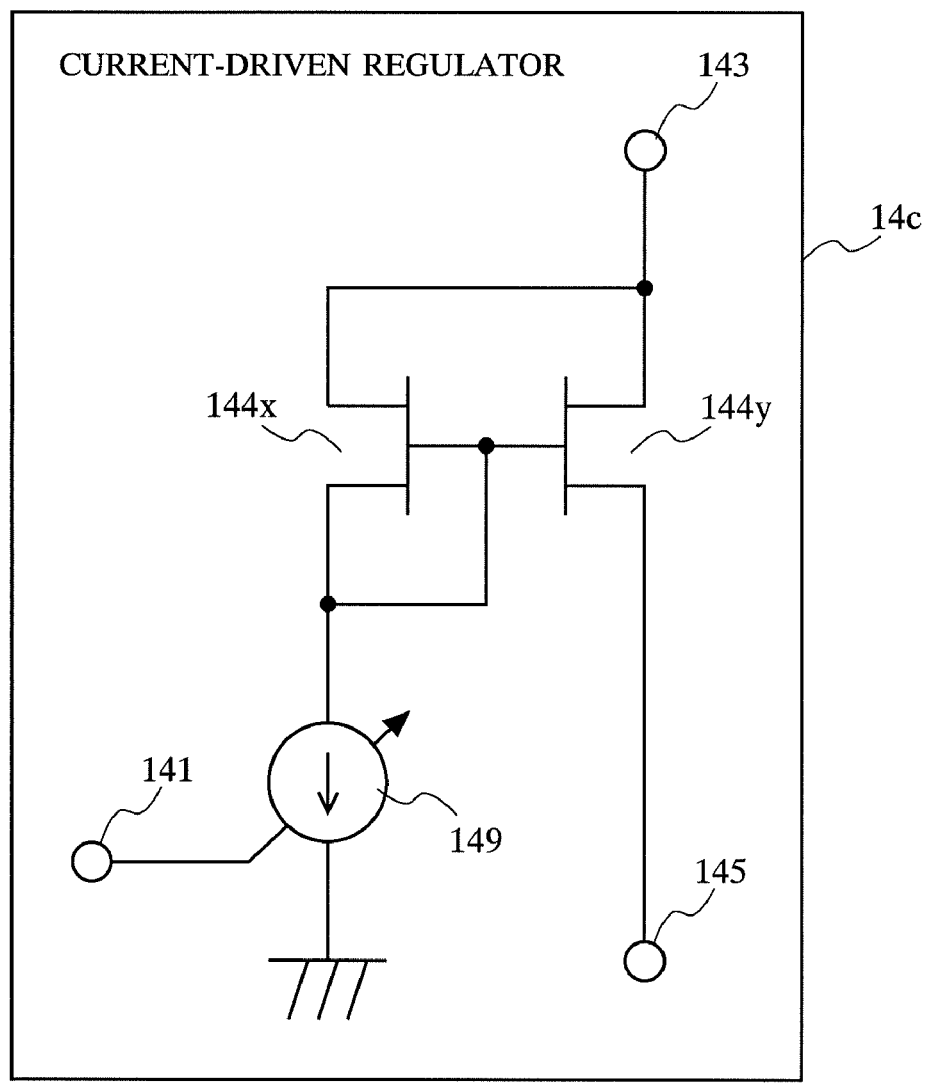
FIG. 8C is a diagram showing an example of a detailed structure of a regulator 14c.

Alternatively, the amplitude amplification section 14 can also be constructed, for example, using a current-driven regulator 14c shown in FIG. 8C. Referring to FIG. 8C, the current-driven regulator 14c includes a variable current source 149, a transistor 144x, and a transistor 144y. To an input terminal 141, the amplitude signal is inputted via the adaptive compensation filter 12. To a power supply terminal 143, a direct-current voltage is supplied. The inputted amplitude signal is outputted to an output terminal 145 via the variable current source 149, the transistor 144$x$, and the transistor 144$y$, as a current controlled by the magnitude of the amplitude signal. This current-driven regulator 14$c$ is useful when the amplitude modulation section 15 is constructed using a bipolar transistor. Note that, regardless of whether the transistors 144$x$ and 144$y$ are a FET or a BT, it is possible to obtain a similar effect.

Next, the amplitude modulation section 15 can have a structure, for example, as shown in FIG. 9A. Referring to FIG. 9A, an amplitude modulation section 15$a$ includes a matching circuit 152, a bias circuit 153, a bipolar transistor (BT) 155, a bias circuit 156, and a matching circuit 158. To an input terminal 151, the angle-modulated signal S$\theta$ is inputted from the signal generation section 11. The angle-modulated signal S$\theta$ is then inputted to the base of the BT 155 via the matching circuit 152. To a power supply terminal 154, a direct-current voltage is applied. That is, to the base of the BT 155, a bias voltage is supplied via the power supply terminal 154 and the bias circuit 153. To an input terminal 157, a signal controlled by the magnitude of the amplitude signal is inputted from the amplitude amplification section 14. The signal controlled by the magnitude of the amplitude signal is outputted to the collector of the BT 155 via the bias circuit 156. The BT 155 amplitude-modulates the angle-modulated signal S$\theta$ by the signal controlled by the magnitude of the amplitude signal and outputs the resulting signal as an angle-modulated and amplitude-modulated signal. The modulated signal outputted from the BT 155 is outputted to an output terminal 159 via the matching circuit 158. Note that the BT 155 may be a FET. Further, the amplitude modulation section 15$a$ may switch the signals inputted to the power supply terminal 154 and the input terminal 157, in which case it is also possible to obtain a similar effect.

Figure 9B:
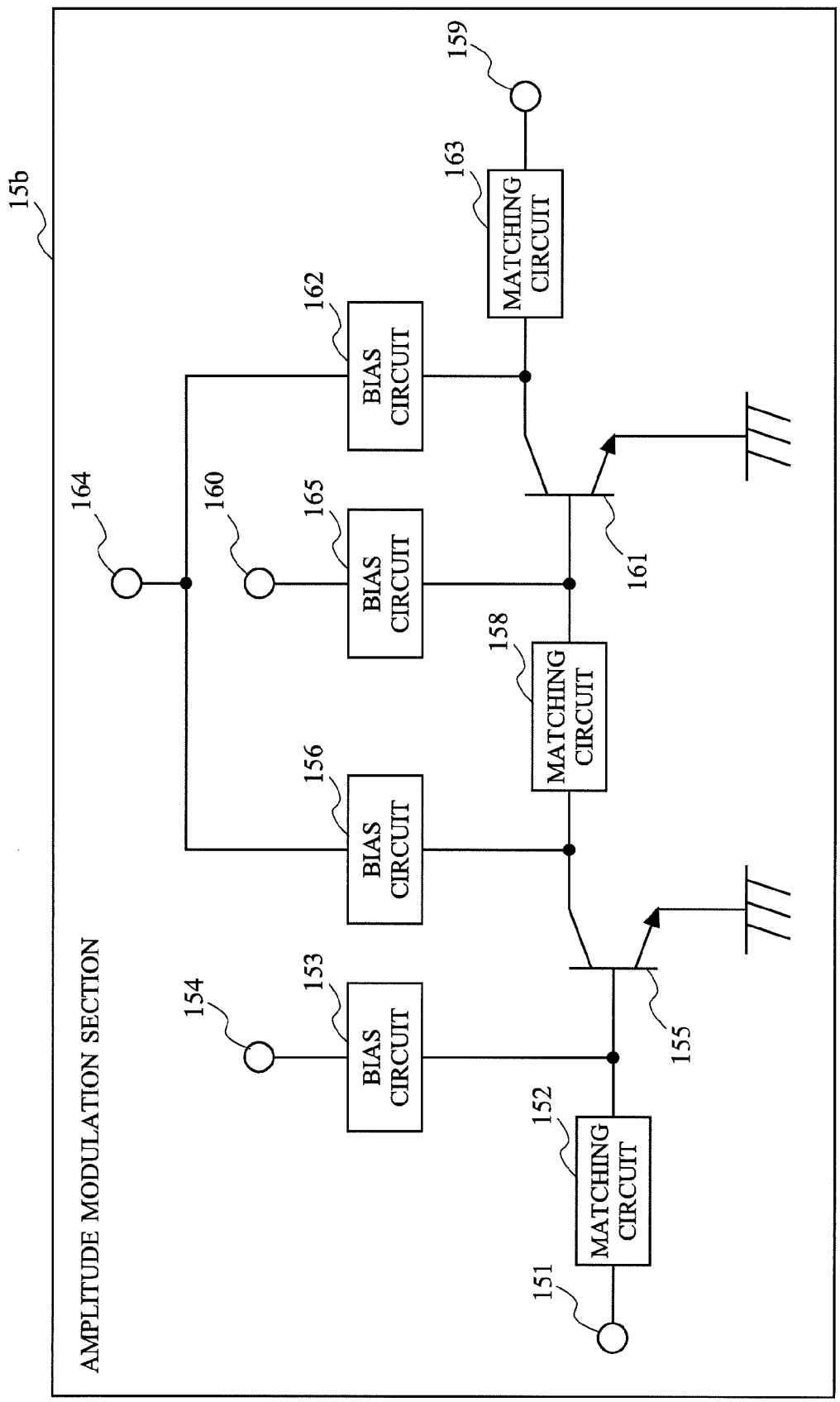
FIG. 9B is a diagram showing an example of a detailed structure of an amplitude modulation section 15b.

Note that the amplitude modulation section 15 may have a different structure from that of the amplitude modulation section 15$a$ described above. FIG. 9B is a diagram showing an example of the structure of an amplitude modulation section 15$b$. The amplitude modulation section 15$b$ has a structure where, basically, two amplitude modulation sections 15$a$ of FIG. 9A are connected in series with each other. To the base of a BT 155, a bias voltage is supplied from a power supply terminal 154 via a bias circuit 153. To the base of a BT 161, a bias voltage is supplied from a power supply terminal 160 via a bias circuit 165. To the collector of the BT 155, a signal controlled by the magnitude of the amplitude signal is inputted from the amplitude amplification section 14 via a bias circuit 156. To the collector of the BT 161, a signal controlled by the magnitude of the amplitude signal is inputted from the amplitude amplification section 14 via a bias circuit 162. Based on this structure, the amplitude modulation section 15$b$ can output a signal having a greater dynamic range than that of the amplitude modulation section 15$a$ of FIG. 9A. Note that each transistor of the amplitude modulation sections 15$a$ and 15$b$ is a BT, but may be a FET.

As described above, based on the transmitter 1 according to the first embodiment of the present invention, the adaptive compensation filter 12 dynamically performs an operation of compensating for the amplitude signal M, in accordance with the magnitude of the amplitude signal M, so that the adaptive compensation filter 12 has the inverse characteristics of the transfer characteristics from the input of the amplitude amplification section 14 to the output of the amplitude modulation section 15. This makes it possible to suppress the distortion caused by the insufficiency of the frequency bandwidths of the amplitude amplification section 14 and the amplitude modulation section 15. Therefore, the transmitter 1 can operate with low distortion and at high efficiency even in a wideband modulation scheme.

Note that, in comparing a switching regulator to a series regulator, generally, the switching regulator has the advantage of having high efficiency but also has the disadvantage of having a narrow band. However, the high-efficiency switching regulator can be applied even in the case where only a series regulator has conventionally been able to secure a modulation bandwidth, since the transmitter 1, by using the adaptive compensation filter 12, operates with low distortion even with a narrow band. Therefore, the transmitter 1 according to the first embodiment can further reduce low consumption power.

Second Embodiment

Figure 10:
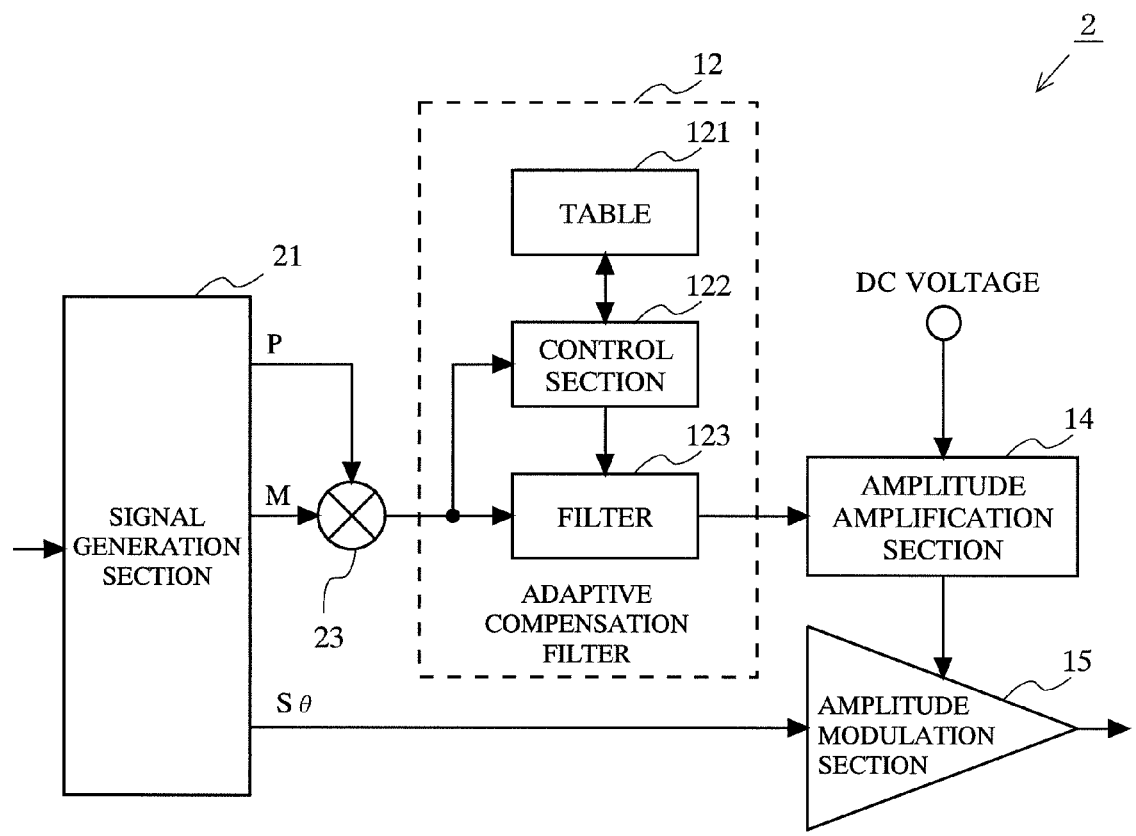
FIG. 10 is a diagram showing the structure of a transmitter 2 according to a second embodiment of the present invention.

FIG. 10 is a diagram showing the structure of a transmitter 2 according to a second embodiment of the present invention. Referring to FIG. 10, the transmitter 2 includes a signal generation section 21, a multiplication section 23, an adaptive compensation filter 12, an amplitude amplification section 14, and an amplitude modulation section 15. The adaptive compensation filter 12 includes a table 121, a control section 122, and a filter 123.

The transmitter 2 according to the second embodiment is different from the transmitter 1 according to the first embodiment in that the transmitter 2 has the signal generation section 21 and the multiplication section 23. These different components of the transmitter 2 will be described below, while the same components as those of the transmitter 1 will be denoted by the same numerals and will not be described.

The signal generation section 21 outputs power information P set based on a baseband, as well as outputting an amplitude signal M and an angle-modulated signal S$\theta$ based on an amplitude component and a phase component that are obtained by performing signal processing on input data. In the case of a W-CDMA system, for example, the power information P is determined based on the power transmitted from a base station. The multiplication section 23 multiplies the amplitude signal M, outputted from the signal generation section 21, by the power information P, also outputted from the signal generation section 21. After the resulting multiplied signal is inputted to the adaptive compensation filter 12, the same process as that described in the first embodiment is performed.

As described above, based on the transmitter 2 according to the second embodiment of the present invention, the adaptive compensation filter 12 dynamically performs an operation of compensating for the amplitude signal M, in accordance with the magnitude of the amplitude signal M having the power information P provided thereto, so that the adaptive compensation filter 12 has the inverse characteristics of the transfer characteristics from the input of the amplitude amplification section 14 to the output of the amplitude modulation section 15. This makes it possible to suppress the distortion caused by the insufficiency of the frequency bandwidths of the amplitude amplification section 14 and the amplitude modulation section 15. Therefore, the transmitter 2 can operate with low distortion and at high efficiency even in a wideband modulation scheme.

Third Embodiment

Figure 11:
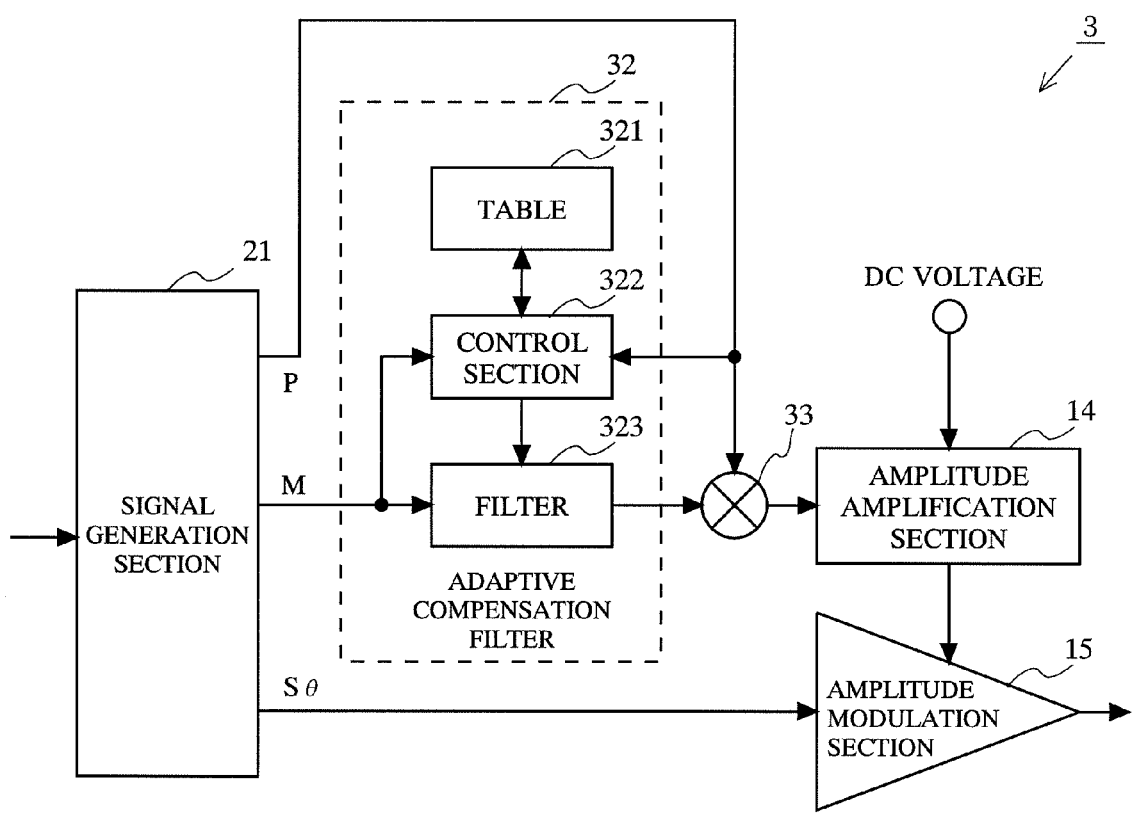
FIG. 11 is a diagram showing the structure of a transmitter 3 according to a third embodiment of the present invention.

FIG. 11 is a diagram showing the structure of a transmitter 3 according to a third embodiment of the present invention.

Referring to FIG. 11, the transmitter 3 includes a signal generation section 21, an adaptive compensation filter 32, a multiplication section 33, an amplitude amplification section 14, and an amplitude modulation section 15. The adaptive compensation filter 32 includes a table 321, a control section 322, and a filter 323.

The transmitter 3 according to the third embodiment is different from the transmitter 2 according to the second embodiment in that the transmitter 3 has the adaptive compensation filter 32 and the multiplication section 33. These different components of the transmitter 3 will be described below, while the same components as those of the transmitters 1 and 2 will be denoted by the same numerals and will not be described.

In the table 321, the filter coefficients used by the filter 323 are each stored in accordance with the power information P and the magnitude of the amplitude signal M. The table 321 of FIG. 12 shows filter coefficients b0, b1, and a1 in the case where a FIR filter (FIG. 3A) or an IIR filter (FIG. 3B) is used as the filter 323, the power information P is classified into three groups, and the magnitude of the amplitude signal M (the magnitude of the signal m, as in FIG. 2) is classified into four groups. The filter coefficients stored in the table 321 are set in advance to such values that the filter 323 can have the inverse characteristics of the transfer characteristics from the input of the amplitude amplification section 14 to the output of the amplitude modulation section 15, with respect to each piece of the power information P and each magnitude of the amplitude signal M. This method of setting the filter coefficients is as described in the first embodiment.

The control section 322 receives the power information P and the amplitude signal M that are outputted from the signal generation section 21, and determines the power information P and the magnitude of the amplitude signal M. The control section 322 selects the filter coefficients associated with the determined information and magnitude with reference to the table 321. The filter 323 compensates for the frequency characteristics of the amplitude signal M, using the filter coefficients selected by the control section 322. The multiplication section 33 multiplies the power information P, outputted from the signal generation section 21, by the signal outputted from the adaptive compensation filter 32. After the resulting multiplied signal is inputted to the amplitude amplification section 14, the same process as that described in the first embodiment is performed.

As described above, based on the transmitter 3 according to the third embodiment of the present invention, the adaptive compensation filter 32 dynamically performs an operation of compensating for the amplitude signal M, in accordance with both the magnitude of the amplitude signal M and the power information P, so that the adaptive compensation filter 32 has the inverse characteristics of the transfer characteristics from the input of the amplitude amplification section 14 to the output of the amplitude modulation section 15. This makes it possible to suppress the distortion caused by the insufficiency of the frequency bandwidths of the amplitude amplification section 14 and the amplitude modulation section 15. Therefore, the transmitter 3 can operate with low distortion and at high efficiency even in a wideband modulation scheme.

Fourth Embodiment

Figure 13A:
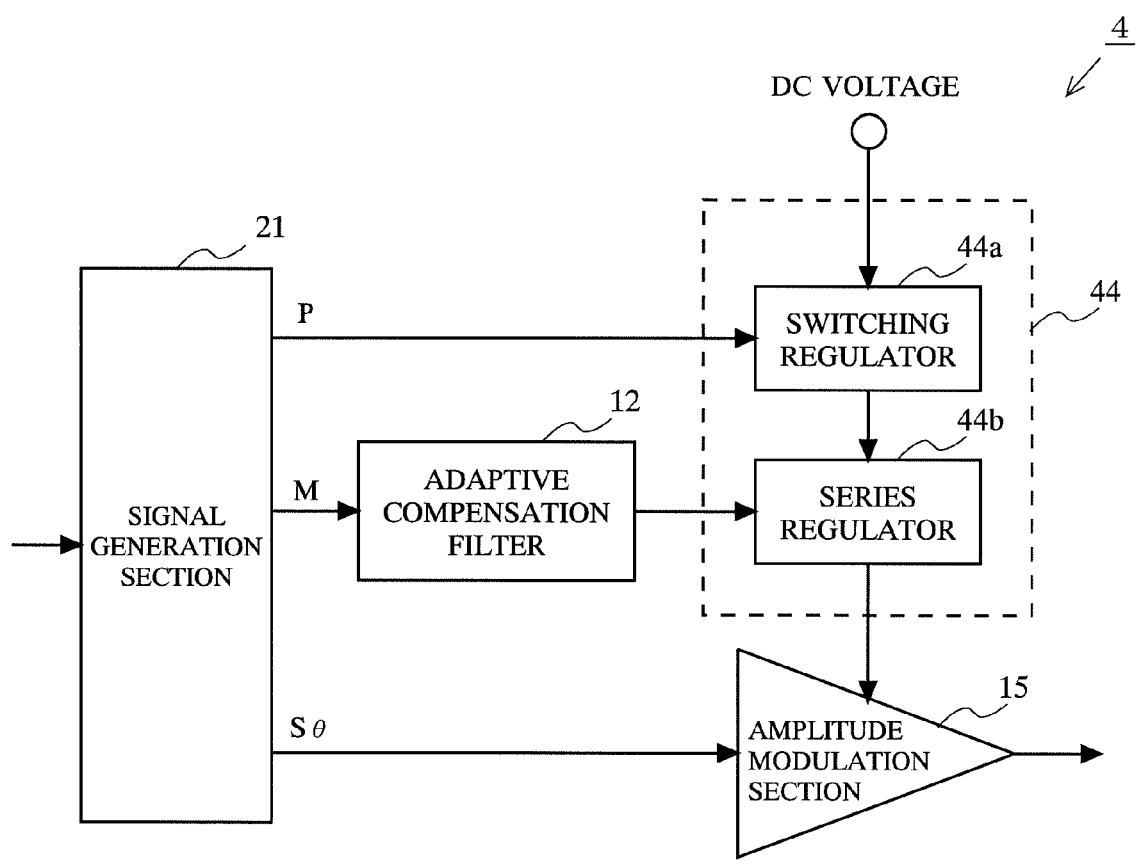
FIG. 13A is a diagram showing the structure of a transmitter 4 according to a fourth embodiment of the present invention.

FIG. 13A is a diagram showing the structure of a transmitter 4 according to a fourth embodiment of the present invention. Referring to FIG. 13A, the transmitter 4 includes a signal generation section 21, an adaptive compensation filter 12, an amplitude amplification section 44, and an amplitude modulation section 15. The amplitude amplification section 44 is voltage-driven and includes a switching regulator 44a and a series regulator 44b.

The transmitter 4 according to the fourth embodiment is different from the transmitter 1 according to the first embodiment in that the transmitter 4 has the signal generation section 21 and the amplitude amplification section 44. These different components of the transmitter 4 will be described below, while the same components as those of the transmitter 1 will be denoted by the same numerals and will not be described.

The signal generation section 21 outputs power information P set based on a baseband, as well as outputting an amplitude signal M and an angle-modulated signal Sθ based on an amplitude component and a phase component that are obtained by performing signal processing on input data. In the case of a W-CDMA system, for example, the power information P is determined based on the power transmitted from a base station. The power information P is inputted to the switching regulator 44a.

The switching regulator 44a controls, by the power information P, a direct-current voltage supplied from a power supply terminal and supplies the controlled voltage to the series regulator 44b. Since the power information P has a lower frequency than that of the amplitude signal M, the switching regulator 44a can operate at high efficiency. Note that the controlled voltage outputted from the switching regulator 44a is set to be equal to or slightly higher than the maximum value of the voltage outputted from the series regulator 44b.

Since the controlled voltage supplied from the switching regulator 44a is optimally controlled, the series regulator 44b can operate at high efficiency. Thus, the transmitter 4 can reduce the loss in the series regulator 44b, thereby reducing the consumption power. Further, since the adaptive compensation filter 12 compensates for the frequency characteristics of the series regulator 44b and the amplitude modulation section 15, the transmitter 4 can improve the linearity of the transmitted signal.

Figure 13B:
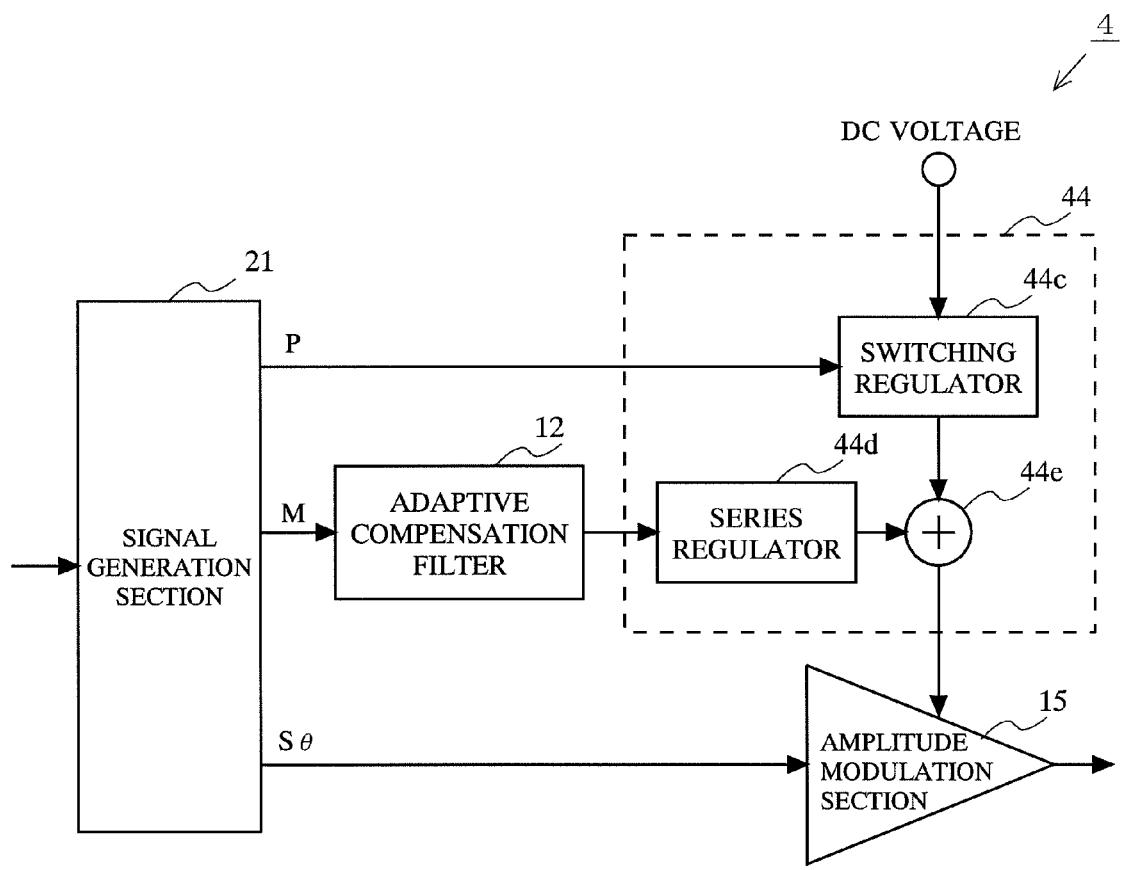
FIG. 13B is a diagram showing the structure of another transmitter 4 according to the fourth embodiment of the present invention.

Note that the amplitude amplification section 44 can also be current-driven with a structure shown in FIG. 13B. A switching regulator 44c controls, by the power information P, a direct-current voltage supplied from a power supply terminal and outputs the controlled current to an addition section 44e. A series regulator 44d outputs to the addition section 44e a current corresponding to the magnitude of the signal subjected to waveform shaping in the adaptive compensation filter 12. The addition section 44e adds the output current of the switching regulator 44c to the output current of the series regulator 44d and supplies the resulting current to the amplitude modulation section 15.

Fifth Embodiment

FIG. 14 is a diagram showing the structure of a transmitter 5 according to a fifth embodiment of the present invention. Referring to FIG. 14, the transmitter 5 includes a signal generation section 11, an adaptive compensation filter 12, an amplitude calculation section 51, an amplitude amplification section 44, and an amplitude modulation section 15.

The transmitter 5 according to the fifth embodiment is different from the transmitter 1 according to the first embodiment in that the transmitter 5 has the amplitude calculation section 51 and the amplitude amplification section 44. This different component of the transmitter 5 will be described below, while the same components as those of the transmitters 1 and 4 will be denoted by the same numerals and will not be described.

Figure 15:
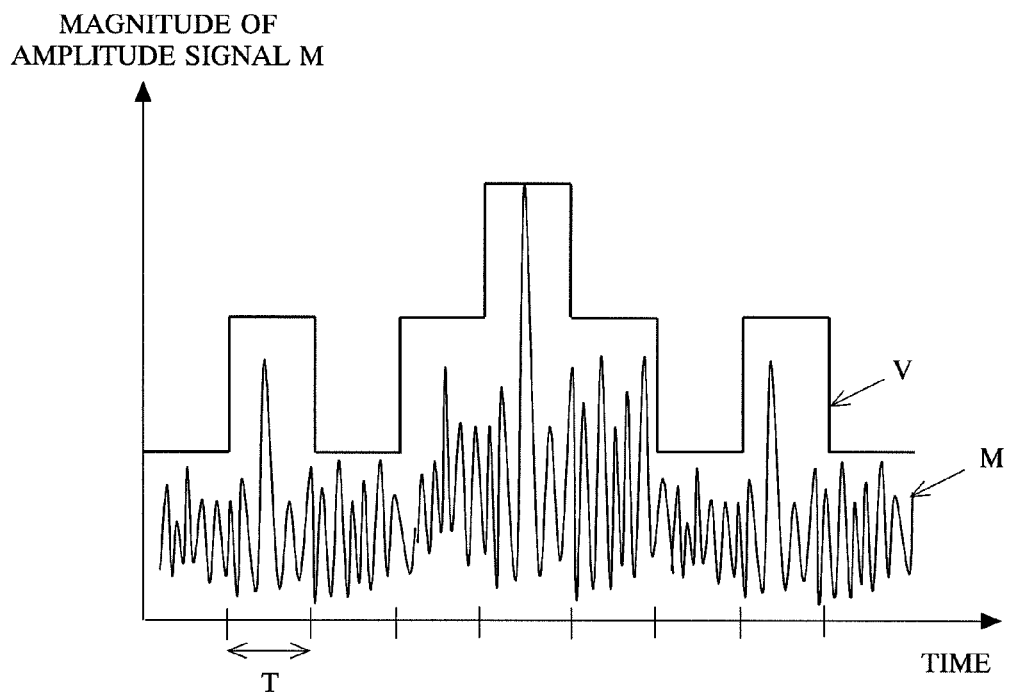
FIG. 15 is a diagram showing the relation between a discrete value V, outputted from an amplitude calculation section 51, and an amplitude signal M.

The amplitude calculation section 51 compares an amplitude signal M to one or more threshold values at predetermined time intervals and outputs a discrete value V selected in accordance with the magnitude of the amplitude signal M. FIG. 15 is a diagram showing the relation between the discrete value V, outputted from the amplitude calculation section 51, and the amplitude signal M. As shown in FIG. 15, the amplitude calculation section 51 sets a predetermined time interval T to be longer than the time during which the envelope of the amplitude signal M fluctuates. That is, the transmitter 5 can control the power of the transmitted signal at the predetermined time intervals T.

Figure 16:
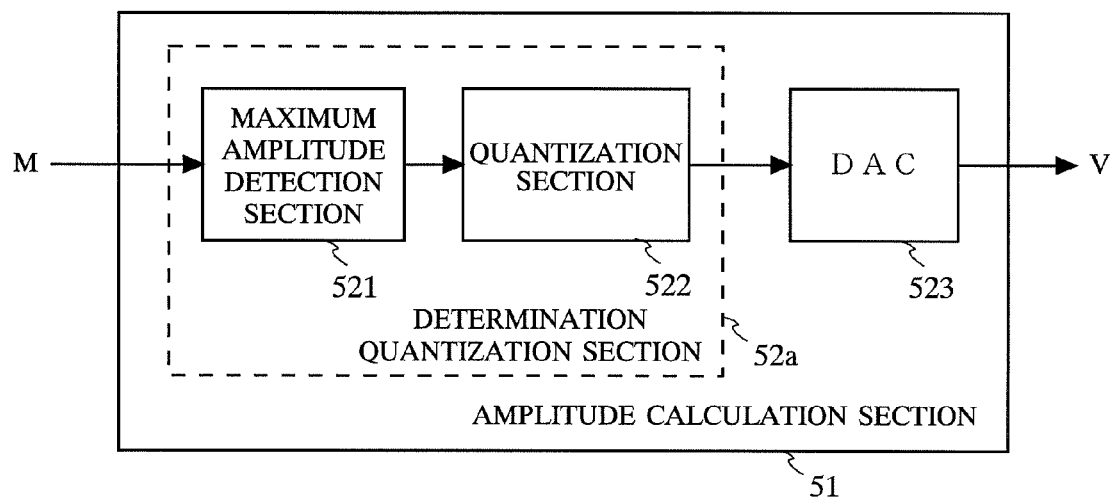
FIG. 16 is a diagram showing an example of a detailed structure of the amplitude calculation section 51.

FIG. 16 is a block diagram showing an example of the structure of the amplitude calculation section 51. Referring to FIG. 16, the amplitude calculation section 51 includes a determination quantization section 52a and a D/A converter 523. To the determination quantization section 52a, the amplitude signal M is inputted from the signal generation section 11. The determination quantization section 52a has at least one threshold value and two or more discrete values corresponding to the threshold value. The determination quantization section 52a determines at predetermined time intervals whether or not the maximum value of the amplitude signal M exceeds the threshold value, selects a discrete value to be outputted in accordance with the determination, and outputs a signal having the selected discrete value.

Note that, in the description above, the determination quantization section 52a determines at the predetermined intervals whether or not the maximum value of the amplitude signal M exceeds the threshold value, but it is not necessarily required to determine whether or not the maximum value of the amplitude signal M exceeds the threshold value. The determination quantization section 52a may determine at the predetermined intervals whether or not the amplitude signal M exceeds the threshold value, and select a discrete value to be outputted based on the determination.

Figure 17A:
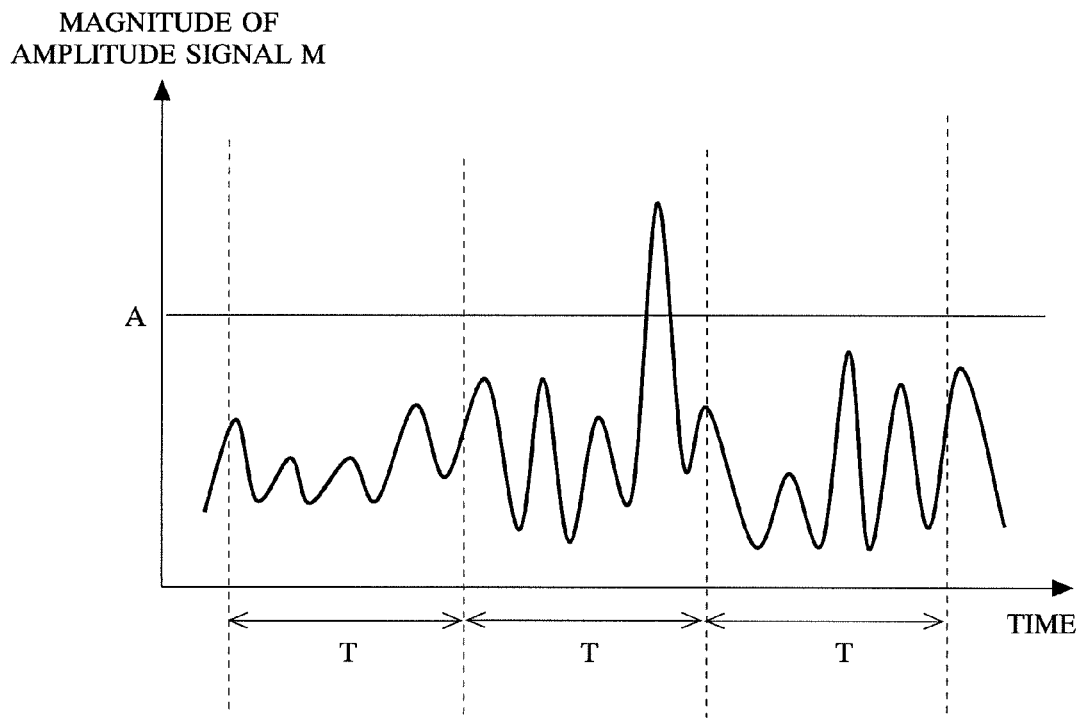
FIG. 17A is a diagram showing an example of the waveform of the amplitude signal M inputted to a maximum amplitude detection section 521.

The determination quantization section 52a may be constructed, for example, using a maximum amplitude detection section 521 and a quantization section 522. The maximum amplitude detection section 521 detects the maximum value of the amplitude signal M at the predetermined time intervals T. FIG. 17A is a diagram showing an example of the waveform of the amplitude signal M inputted to the maximum amplitude detection section 521.

Figure 17B:
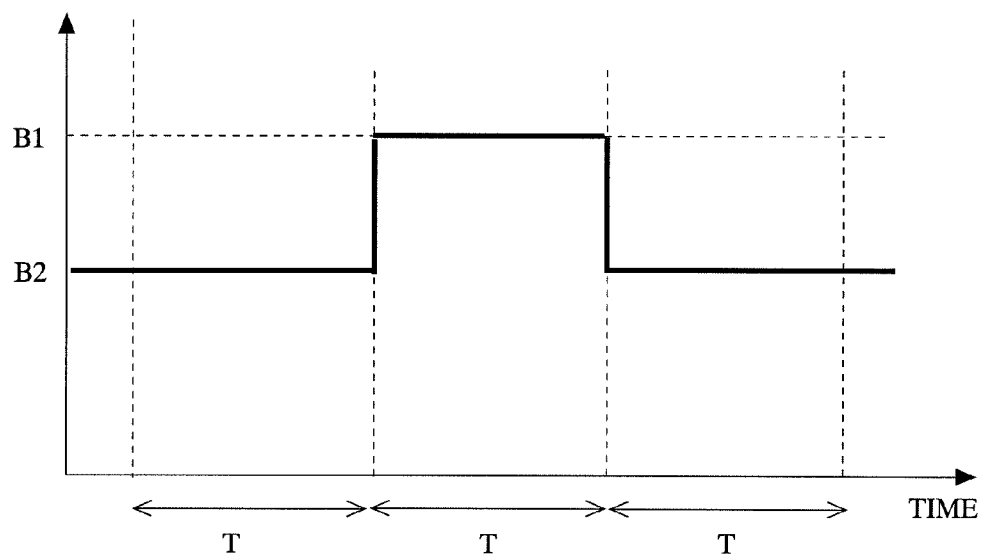
FIG. 17B is a diagram showing an example of the waveform of the signal outputted from a quantization section 522.
Figure 20:
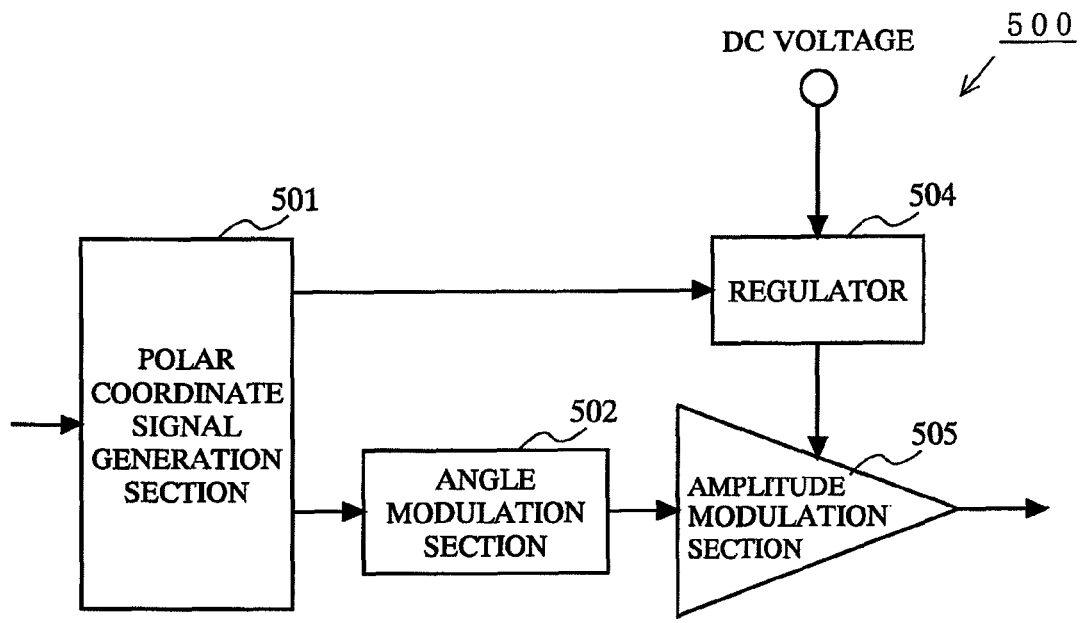
FIG. 20 is a diagram showing an example of the structure of a conventional transmitter 500.
Figure 21:
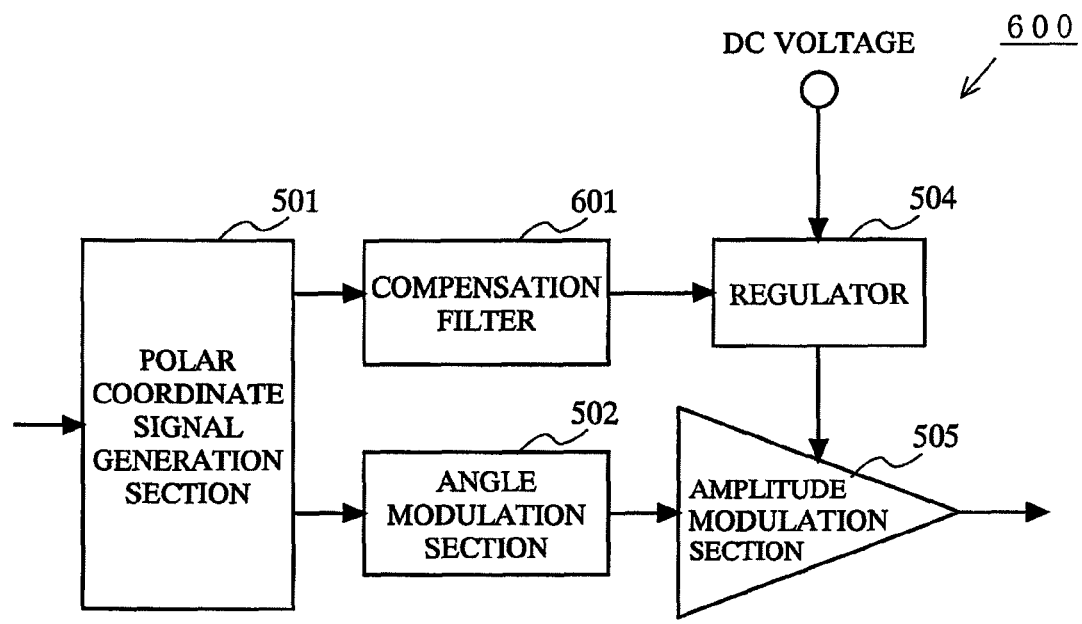
FIG. 21 is a diagram showing an example of the structure of a conventional transmitter 600.

The quantization section 522 has at least one threshold value and two or more discrete values corresponding to the threshold value. The quantization section 522 selects a discrete value to be outputted based on the determination of whether or not the maximum value at a sampling point exceeds the threshold value. Consequently, the quantization section 522 converts the amplitude signal M into a signal discretized by the two or more discrete values. FIG. 17B is a diagram showing an example of the waveform of the signal outputted from the quantization section 522. As shown in FIG. 17B, the quantization section 522 outputs a discrete value B1 when the magnitude of the maximum value at the sampling point exceeds a threshold value A, otherwise the quantization section 522 outputs a discrete value B2. Here, B1>B2. The signal outputted from the quantization section 522 is converted into an analog signal by the D/A converter 523.

Note that, in the description above, the quantization section 522 sets one threshold value A and outputs two discrete values B1 and B2, but the quantization section 522 may set two threshold values and output three discrete values, or may set more threshold values and output more discrete values.

Alternatively, the amplitude calculation section 51 may not include the D/A converter 523. In this case, the amplitude calculation section 51 outputs the signal outputted from the determination quantization section 52a, which remains a digital signal, and controls the switching regulator 44a by the digital signal.

As described above, based on the transmitter 5 according to the fifth embodiment of the present invention, since the amplitude calculation section 51 outputs the discrete value selected in accordance with the maximum value of the amplitude signal M at the predetermined intervals, the amplitude amplification section 44 can optimally control the voltage to be supplied to the amplitude modulation section 15.

Note that, to the amplitude calculation section 51, an IQ signal inputted to the signal generation section 11 may be directly inputted, instead of the amplitude signal M outputted from the adaptive compensation filter 12 (FIG. 18).

Sixth Embodiment

FIG. 19 is a diagram showing an example of the structure of a communication apparatus 200 according to a sixth embodiment of the present invention. Referring to FIG. 19, the communication apparatus 200 includes a transmitter 210, a receiver 220, an antenna duplexer section 230, and an antenna 240. The transmitter 210 is any one of the transmitters 1 through 5 according to the first through fifth embodiments. The antenna duplexer section 230 transmits to the antenna 240 a transmitted signal outputted from the transmitter 210 and prevents the transmitted signal from leaking to the receiver 220. The antenna duplexer section 230 transmits to the receiver 220 a received signal inputted from the antenna 240 and prevents the received signal from leaking to the transmitter 210.

Therefore, the transmitted signal is outputted from the transmitter 210 and then is emitted into space from the antenna 240 via the antenna duplexer section 230. The received signal is received by the antenna 240 and then is received by the receiver 220 via the antenna duplexer section 230.

By using the transmitters 1 through 5 according to the first through fifth embodiments, the communication apparatus 200 according to the sixth embodiment can secure the linearity of the transmitted signal and realize low distortion as a wireless apparatus. Further, since the output of the transmitter 210 does not have a branch such as a directional coupler, it is possible to reduce the loss from the transmitter 210 to the antenna 240, thereby reducing the consumption power at the time of transmission. Thus, the communication apparatus 200 can be used as a wireless communication apparatus for a prolonged time. Note that the communication apparatus 200 may include only the transmitter 210 and the antenna 240.

While the invention has been described in detail, the foregoing description is in all aspects illustrative and not restrictive. It is understood that numerous other modifications and variations can be devised without departing from the scope of the invention.

What is claimed is:

1. A transmitter for generating and outputting a transmitted signal based on inputted data, the transmitter comprising:

a signal generation section operable to generate an amplitude signal and an angle-modulated signal based on an amplitude component and a phase component that are obtained by performing signal processing on the data;

an adaptive compensation filter operable to select filter values corresponding to a magnitude of the amplitude signal and operable to perform waveform shaping on the amplitude signal in accordance with characteristics obtained from the selected filter values;

an amplitude amplification section operable to output a signal corresponding to a magnitude of the amplitude signal subjected to the waveform shaping in the adaptive compensation filter; and an amplitude modulation section operable to amplitude-modulate the angle-modulated signal by the signal outputted from the amplitude amplification section and operable to output a resulting signal as a modulated signal, wherein the characteristics, obtained from the selected filter values in the adaptive compensation filter, are inverse characteristics of transfer characteristics from an input of the amplitude amplification section to an output of the amplitude modulation section, with respect to the magnitude of the amplitude signal generated by the signal generation section.

2. The transmitter according to claim 1,
wherein the adaptive compensation filter includes:
a table having stored therein filter coefficients as the filter values corresponding to the magnitude of the amplitude signal;
a control section operable to determine the magnitude of the amplitude signal and operable to select filter coefficients from the table corresponding to the determined magnitude; and
a filter operable to perform the waveform shaping on the amplitude signal, using the filter coefficients selected by the control section.

3. The transmitter according to claim 1,
wherein the signal generation section further outputs power information set based on a baseband of the transmitter, and
wherein the amplitude amplification section includes:
a switching regulator operable to receive the power information and operable to output a voltage controlled by the power information; and
a series regulator operable to receive the voltage outputted from the switching regulator and operable to output a signal corresponding to the magnitude of the amplitude signal subjected to the waveform shaping in the adaptive compensation filter.

4. The transmitter according to claim 1,
wherein the signal generation section further outputs power information set based on a baseband of the transmitter, and
wherein the amplitude amplification section includes:
a switching regulator operable to receive the power information and operable to output a current controlled by the power information;
a series regulator operable to output a current corresponding to the magnitude of the amplitude signal subjected to the waveform shaping in the adaptive compensation filter; and
an addition section operable to add the current outputted from the switching regulator to the current outputted from the series regulator and operable to output an addition result.

5. A transmitter for generating and outputting a transmitted signal based on inputted data, the transmitter comprising:
a signal generation section operable to generate an amplitude signal and an angle-modulated signal based on an amplitude component and a phase component that are obtained by performing signal processing on the data and operable to output power information set based on a baseband of the transmitter;

a multiplication section operable to multiply the amplitude signal by the power information and output a product signal;

an adaptive compensation filter operable to select filter values corresponding to a magnitude of the product signal outputted from the multiplication section and operable to perform waveform shaping on the product signal, outputted from the multiplication section, in accordance with characteristics obtained from the selected filter values;

an amplitude amplification section operable to output a signal corresponding to a magnitude of the product signal subjected to waveform shaping in the adaptive compensation filter; and an amplitude modulation section operable to amplitude-modulate the angle-modulated signal by the signal outputted from the amplitude amplification section and operable to output a resulting signal as a modulated signal, wherein the characteristics, obtained from the selected filter values in the adaptive compensation filter, are inverse characteristics of transfer characteristics from an input of the amplitude amplification section to an output of the amplitude modulation section, with respect to the magnitude of the product signal from the multiplication section.

6. The transmitter according to claim 5,
wherein the adaptive compensation filter includes:
a table having stored therein filter coefficients as the filter values corresponding to the magnitude of the product signal outputted from the multiplication section;
a control section operable to determine the magnitude of the product signal outputted from the multiplication section and operable to select filter coefficients from the table corresponding to the determined magnitude; and
a filter operable to perform the waveform shaping on the product signal outputted from the multiplication section, using the filter coefficients selected by the control section.

7. A transmitter for generating and outputting a transmitted signal based on inputted data, the transmitter comprising:
a signal generation section operable to generate an amplitude signal and an angle-modulated signal based on an amplitude component and a phase component that are obtained by performing signal processing on the data and operable to output power information set based on a baseband of the transmitter;
an adaptive compensation filter operable to select filter values corresponding to a magnitude of the amplitude signal and the power information and operable to perform waveform shaping on the amplitude signal in accordance with characteristics obtained from the selected filter values;
a multiplication section operable to multiply the amplitude signal subjected to the waveform shaping in the adaptive compensation filter by the power information and output a product signal;
an amplitude amplification section operable to output a signal corresponding to a magnitude of the product signal outputted from the multiplication section; and
an amplitude modulation section operable to amplitude-modulate the angle-modulated signal by the signal outputted from the amplitude amplification section and operable to output a resulting signal as a modulated signal,
wherein the characteristics, obtained from the selected filter values in the adaptive compensation filter, are inverse characteristics of transfer characteristics from an input of the amplitude amplification section to an output of the amplitude modulation section, with respect to a magnitude in accordance with the amplitude signal generated by the signal generation section and the power information outputted by the signal generation section.

8. The transmitter according to claim 7,
wherein the adaptive compensation filter includes:
a table having stored therein filter coefficients as the filter values corresponding to a combination of the magnitude of the amplitude signal and the power information;
a control section operable to separately determine the magnitude of the amplitude signal and the power information and operable to select filter coefficients from the table corresponding to the determinations; and
a filter operable to perform the waveform shaping on the amplitude signal, using the filter coefficients selected by the control section.

9. A transmitter for generating and outputting a transmitted signal based on inputted data, the transmitter comprising:
a signal generation section operable to generate an amplitude signal and an angle-modulated signal based on an amplitude component and a phase component that are obtained by performing signal processing on the data;
an adaptive compensation filter operable to select filter values corresponding to a magnitude of the amplitude signal and operable to perform waveform shaping on the amplitude signal in accordance with characteristics obtained from the selected filter values;
an amplitude calculation section operable to perform a predetermined calculation on the amplitude signal subjected to the waveform shaping in the adaptive compensation filter and operable to output a resulting signal;
a switching regulator operable to receive the resulting signal output from the amplitude calculation section and operable to output a voltage controlled by the resulting signal;
a series regulator operable to receive the voltage outputted from the switching regulator and operable to output a signal corresponding to a magnitude of the amplitude signal subjected to the waveform shaping in the adaptive compensation filter; and
an amplitude modulation section operable to amplitude-modulate the angle-modulated signal by the signal outputted from the series regulator and operable to output a resulting signal as a modulated signal,
wherein the characteristics, obtained from the selected filter values in the adaptive compensation filter, are inverse characteristics of transfer characteristics from an input of the switching regulator to an output of the amplitude modulation section, with respect to the magnitude of the amplitude signal generated by the signal generation section.

10. A communication apparatus including:
the transmitter according to claim 1, operable to generate a transmitted signal; and
an antenna operable to output the transmitted signal generated by the transmitter.

11. The communication apparatus according to claim 10, further including:
a receiver operable to process a received signal received from the antenna; and
an antenna duplexer section operable to output to the antenna the transmitted signal generated by the transmitter and operable to output to the receiver the received signal received from the antenna.

12. A communication apparatus including:
the transmitter according to claim 5, operable to generate a transmitted signal; and
an antenna operable to output the transmitted signal generated by the transmitter.

13. A communication apparatus including:
the transmitter according to claim 7, operable to generate a transmitted signal; and
an antenna operable to output the transmitted signal generated by the transmitter.

14. A communication apparatus including:
the transmitter according to claim 9, operable to generate a transmitted signal; and
an antenna operable to output the transmitted signal generated by the transmitter.

15. The communication apparatus according to claim 12, further including:
a receiver operable to process a received signal received from the antenna; and
an antenna duplexer section operable to output to the antenna the transmitted signal generated by the transmitter and operable to output to the receiver the received signal received from the antenna.

16. The communication apparatus according to claim 13, further including:
a receiver operable to process a received signal received from the antenna; and
an antenna duplexer section operable to output to the antenna the transmitted signal generated by the transmitter and operable to output to the receiver the received signal received from the antenna.

17. The communication apparatus according to claim 14, further including:
a receiver operable to process a received signal received from the antenna; and
an antenna duplexer section operable to output to the antenna the transmitted signal generated by the transmitter and operable to output to the receiver the received signal received from the antenna.

* * * * *